(12) United States Patent
Jellinek et al.

(10) Patent No.: US 7,293,074 B1
(45) Date of Patent: Nov. 6, 2007

(54) PERFORMING SERVER ACTIONS USING TEMPLATE WITH FIELD THAT CAN BE COMPLETED WITHOUT OBTAINING INFORMATION FROM A USER

(75) Inventors: Herbert D. Jellinek, Aptos, CA (US); Stephen M. Rudy, Palo Alto, CA (US)

(73) Assignee: fusionOne, Inc., San Jose, CA (US)

( * ) Notice: Subject to any disclaimer, the term of this patent is extended or adjusted under 35 U.S.C. 154(b) by 458 days.

(21) Appl. No.: 09/665,315

(22) Filed: Sep. 19, 2000

Related U.S. Application Data

(63) Continuation-in-part of application No. 09/652,761, filed on Aug. 31, 2000, now Pat. No. 6,360,252.

(60) Provisional application No. 60/155,024, filed on Sep. 20, 1999.

(51) Int. Cl.
*G06F 15/16* (2006.01)

(52) U.S. Cl. ................. 709/218; 709/227; 709/217

(58) Field of Classification Search ............. 709/218, 709/203, 229, 217, 227; 705/37
See application file for complete search history.

(56) References Cited

U.S. PATENT DOCUMENTS

| | | | |
|---|---|---|---|
| 4,887,212 A | 12/1989 | Zamora et al. | |
| 4,948,066 A | 8/1990 | Whalen et al. | |
| 5,111,398 A | 5/1992 | Nunberg et al. | |
| 5,146,221 A | 9/1992 | Whiting et al. | |
| 5,418,908 A | 5/1995 | Keller et al. | |

(Continued)

FOREIGN PATENT DOCUMENTS

EP 0 836 301 A 4/1998

(Continued)

OTHER PUBLICATIONS

Patent Abstracts of Japan, vol. 1998, No. 12, Oct. 31, 1998.

(Continued)

*Primary Examiner*—Jason Cardone
*Assistant Examiner*—Adnan M. Mirza
(74) *Attorney, Agent, or Firm*—Vierra Magen Marcus & DeNiro LLP

(57) ABSTRACT

A server machine has a first user interface for interactively producing templates and a second user interface provided through a client machine, such as a wireless telephone, for performing server actions using templates. In response to signals received through the first user interface, the server produces a template for use in performing server actions, such as creating e-mail messages, scheduling appointments, or submitting database queries. The template includes a field and a attribute data indicating whether it is necessary to obtain information through the second user interface to complete the field. The server receives a request from the client machine for performance of a server action using the template. In response, the server performs the server action, determining from the attribute data whether it is necessary to obtain information to complete the field. If not, the server performs the server action without obtaining information through the second user interface to complete the field. But if it is necessary, the server obtains information from the client machine through the second user interface to complete the field.

26 Claims, 17 Drawing Sheets

U.S. PATENT DOCUMENTS

| | | |
|---|---|---|
| 5,483,352 A | 1/1996 | Fukuyama |
| 5,561,446 A | 10/1996 | Montlick |
| 5,588,009 A | 12/1996 | Will |
| 5,623,406 A | 4/1997 | Ichibah |
| 5,640,577 A | 6/1997 | Scharmer |
| 5,778,361 A | 7/1998 | Nanjo et al. |
| 5,778,367 A | 7/1998 | Wesinger, et al. |
| 5,781,901 A | 7/1998 | Kuzma |
| 5,794,228 A | 8/1998 | French et al. |
| 5,804,803 A | 9/1998 | Cragun et al. |
| 5,818,437 A | 10/1998 | Grover et al. |
| 5,859,973 A | 1/1999 | Carpenter |
| 5,896,321 A | 4/1999 | Miller |
| 5,903,723 A | 5/1999 | Beck et al. |
| 5,923,848 A | 7/1999 | Goodland et al. |
| 5,944,787 A | 8/1999 | Zoken |
| 5,951,636 A | 9/1999 | Zerber |
| 5,970,490 A | 10/1999 | Morgenstern |
| 5,971,277 A | 10/1999 | Cragun et al. |
| 5,995,118 A | 11/1999 | Masuda |
| 6,006,215 A | 12/1999 | Retallick |
| 6,009,462 A | 12/1999 | Birrell et al. |
| 6,073,133 A | 6/2000 | Chrabaszcz |
| 6,101,480 A | 8/2000 | Conmy et al. |
| 6,141,659 A | 10/2000 | Barker et al. |
| 6,157,630 A | 12/2000 | Adler et al. |
| 6,173,310 B1 | 1/2001 | Yost et al. |
| 6,195,794 B1 | 2/2001 | Buxton |
| 6,219,680 B1 | 4/2001 | Bernardo et al. |
| 6,286,053 B1 | 9/2001 | Van Peursem et al. |
| 6,329,680 B1 | 12/2001 | Yoshida et al. |
| 6,333,973 B1 | 12/2001 | Smith et al. |
| 6,473,621 B1 | 10/2002 | Heie |
| 6,542,933 B1 * | 4/2003 | Durst, Jr. et al. ............ 709/229 |
| 6,553,410 B2 * | 4/2003 | Kikinis ........................ 709/218 |
| 6,589,290 B1 * | 7/2003 | Maxwell et al. ............ 715/507 |
| 2003/0084121 A1 * | 5/2003 | De Boor et al. ............ 709/218 |

FOREIGN PATENT DOCUMENTS

| | | |
|---|---|---|
| EP | 0 930 593 A | 7/1999 |
| WO | WO 98/29994 A | 7/1998 |
| WO | WO 98/56159 A | 12/1998 |
| WO | WO 99/46701 A | 9/1999 |

OTHER PUBLICATIONS

Patel, et al., "The Multimedia Fax-Mime Gateway", IEEE Multimedia, IEEE Computer Society, US, vol. 1, NR.4 pp. 64-70, 1994.

Malone, et al., "Semi-Structured Messages are Surprisingly Useful for Computer-Supported Coordination", ACM Press, Online! pp. 102-114, 1986.

* cited by examiner

US 7,293,074 B1

PERFORMING SERVER ACTIONS USING TEMPLATE WITH FIELD THAT CAN BE COMPLETED WITHOUT OBTAINING INFORMATION FROM A USER

RELATED APPLICATIONS

This patent application:

is a continuation-in-part of U.S. patent application entitled TRANSFERRING E-MAIL ATTACHMENTS TO DEVICES FOR RENDERING, U.S. application Ser. No. 09/652,761, filed on Aug. 31, 2001 now U.S. Pat. No. 6,360,252, which claims the benefit of U.S. Provisional Patent Application No. 60/155,024, filed on Sept. 20, 1999, entitled METHOD AND APPARATUS FOR PROVIDING MOBILE ACCESS TO COMPUTER NETWORKS; and claims the benefit of U.S. Provisional Patent Application No. 60/155,024, filed on Sep. 20, 1999, entitled METHOD AND APPARATUS FOR PROVIDING MOBILE ACCESS TO COMPUTER NETWORKS, the contents of which are hereby incorporated by reference in their entirety.

This patent application is also related to

U.S. patent application Ser. No. 09/665,438 entitled PROVIDING ADDRESS BOOK INFORMATION WHEN A LINK FOR AN ADDRESS IN E-MAIL IS SELECTED, filed on the same day herewith; and U.S. patent application Ser. No. 09/664,875 entitled AUTOMATICALLY EXPANDING ABBREVIATED CHARACTER SUBSTRINGS, filed on the same day herewith, the contents of which are hereby incorporated by reference in their entirety.

FIELD OF THE INVENTION

The invention relates to techniques for performing server actions using templates with a field that can be completed without obtaining information from a user.

BACKGROUND OF THE INVENTION

It is becoming increasingly important to be able to access computer-based services using devices other than conventional desktop computers. Such devices include, for example, mobile phones and personal digital assistants (PDAs). Such devices are usually smaller and more portable than their desktop counterparts. However, this portability comes at a price. In particular, such devices typically share three disadvantages relative to conventional desktop computers: they have more cumbersome input mechanisms, they have slower (usually wireless) connections to servers, and they have less on-board computing power.

With respect to input mechanisms, desktop computers typically include QWERTY keyboards. Although a QWERTY keyboard may provide near optimal performance for a skilled user, speed and accuracy problems can arise in character input by an unskilled user. Speed and accuracy problems can also arise even for a skilled QWERTY keyboard user using a client machine with a numeric keypad, a pen-based input device, or other manual character input device that is different from a QWERTY keyboard.

Many computer uses involve actions that require items of information from a user. Examples of such actions include creating e-mail messages, scheduling appointments on an electronic calendar, and creating database queries. In addition to allowing creation of a completely new e-mail message, e-mail systems typically allow a user viewing an existing e-mail message to select "Reply" or "Forward" to create a new e-mail message that includes some items of information automatically extracted from the existing e-mail message. The user can then interactively edit and complete the new e-mail message. A message created in this manner is referred to herein as a "derived message."

Electronic calendar systems similarly allow scheduling of a completely new appointment as well as scheduling of a modified appointment by viewing and modifying an existing appointment. The modified appointment can include items of information automatically extracted from the existing appointment.

Online databases similarly allow creation of completely new database queries as well as creation of a modified version of a previous query. The modified version can include items of information automatically extracted from the previous query.

Any user can make an input error when performing a task that requires user input. The chance of a user input error increases significantly when the user is using a device with an awkward input mechanism. Even when no error is made, when a significant amount of input is required, the input process may be tedious. These and similar problems relating to interactively providing information for actions are referred to generally herein as "information input problems".

Using a device with a small or unsophisticated display may also result in information input problems. For example, a user reading e-mail, scheduling appointments, or submitting database queries from a personal digital assistant (PDA) or mobile telephone may not be able to concurrently view several different parts of a message, appointment, or query as would be possible with a personal computer with a larger screen, making it difficult to satisfactorily edit and complete the message, appointment, or query.

Furthermore, if the user is reading e-mail, scheduling appointments, or submitting queries from a client with a low speed network connection to the e-mail server, complex editing operations would be very slow. For example, it may be necessary for the server to provide a different display each time a change is made.

Based on the foregoing, it is clearly desirable to provide techniques that address the character input problems. In particular, it is desirable to provide techniques that facilitate character input at devices with relatively cumbersome input mechanisms, relatively slow connection speeds, and/or relatively unsophisticated display devices.

SUMMARY OF THE INVENTION

Techniques are provided to alleviate the information input problems by providing templates. A server machine can produce a template in response to signals from a first user interface such as a workstation or computer with a display and keyboard, communicating with the server through the Internet or another network. The template can include an item of data, such as a flag, indicating whether it is necessary, in completing one of its fields, to obtain information through a second user interface of a client machine such as a mobile telephone or PDA. In response to a request from the client machine to perform a server action using the template, it may be possible for the server to complete the field without obtaining further information from the client machine. Therefore, performing server actions such as message creation, appointment scheduling, and database query submission from templates can be much more efficient.

The techniques can be implemented in a method of operating a server machine to perform server actions. As suggested above, the server machine can have a first user interface for interactively producing templates and a second user interface provided through a client machine for obtaining information for performing server actions using templates.

In response to signals received through the first user interface, the method can produce a template for use in performing server actions. The template can include a field and a attribute data indicating whether it is necessary to obtain information through the second user interface to complete the field. The method can receive a request from the client machine for performance of a server action using the template, and in response to the request, the method can perform a server action using the template. In performing the server action, the method can determine from the attribute data whether it is necessary to obtain information to complete the field; if not, the method can perform the server action without obtaining information through the second user interface to complete the field, but if so, the method can obtain information from the client machine through the second user interface to complete the field.

The server action can be creation of a message, and the field can be an address field. For example, the field can be a to-address field and the template can include a message type item of data indicating whether the message is a reply to an existing message. If it is not necessary to obtain information through the second user interface to complete the field, the method can determine from the message type item of data whether the message is a reply; and, if so, the method can automatically extract an address from the existing message to complete the field. The template can also include an address item of data indicating an address, and, if the message is not a reply, the method can use the address item of data to complete the field.

Alternatively, the server action can be creation of a message, and the field can be a subject field. The template can also include a message type item of data indicating whether the message is derived from an existing message. If it is not necessary to obtain information through the second user interface to complete the field, the method can determine from the message type item of data whether the message is derived from an existing message, and, if so, the method can automatically extract a subject from the existing message to complete the field. The template can also include a subject item of data indicating a subject, and, if the message is not derived from an existing message, the method can use the subject item of data to complete the field.

Alternatively, the server action can be creation of a message, and the field can be a body field. The template can also include a body item of data indicating a message body. If it is not necessary to obtain information through the second user interface to complete the field, the method can use the body item of data to complete the field.

Alternatively, the server action could be some other type of action, such as scheduling an appointment or submission of a database query.

In comparison with conventional e-mail creation, appointment scheduling, and database query submission techniques, the techniques are advantageous because they make it possible to reduce the information that the user of the source machine must enter. Based on source items of data for different fields in a template, a server can determine which fields require interactive completion, and need request information only for those fields.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
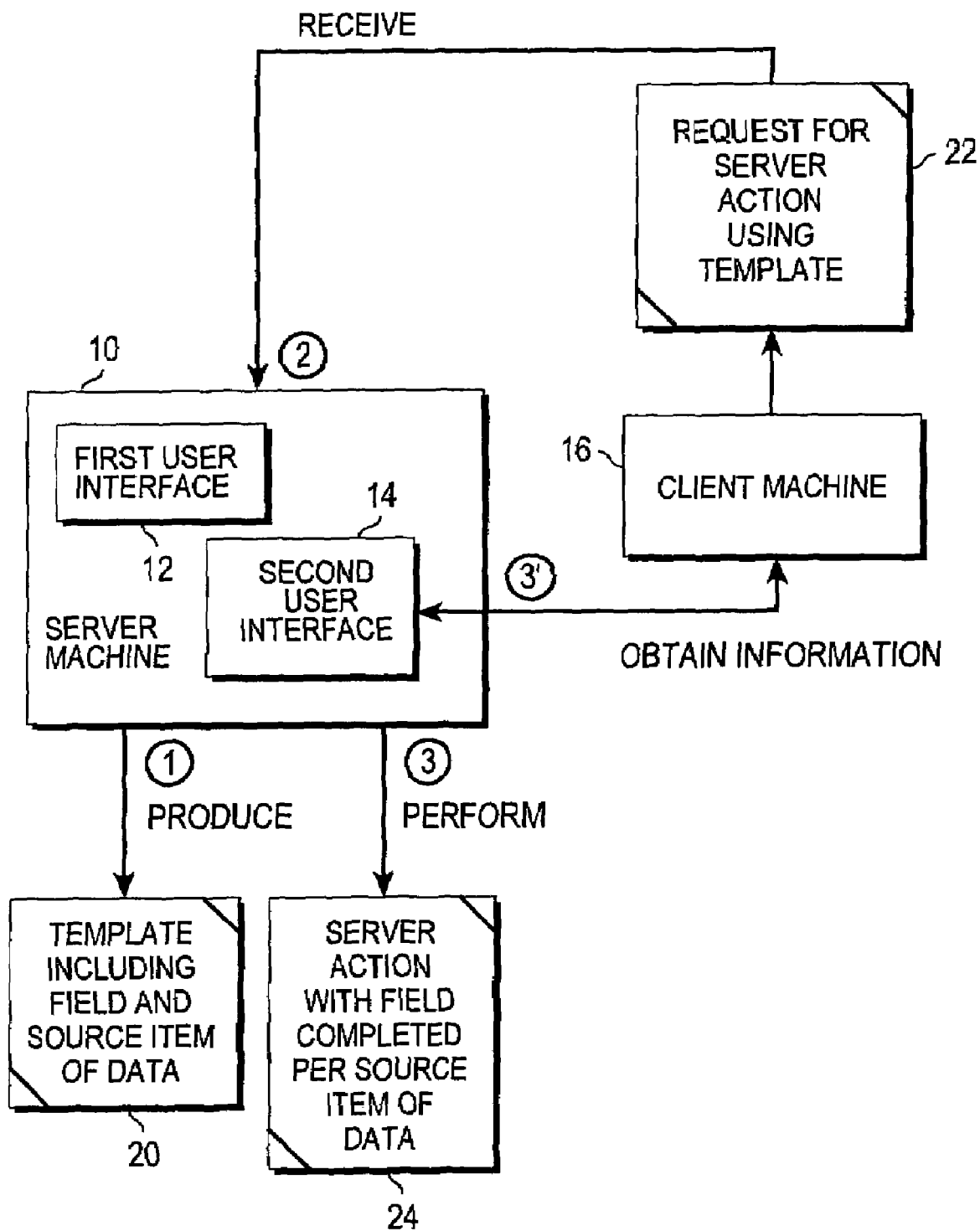
FIG. 1 is a flow diagram illustrating operations of a server machine in performing a server action using a template.

Techniques are described for performing server actions using templates with a field that can be completed without obtaining information from a user. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

TERMS AND TERMINOLOGY

The following terms are used herein to describe various embodiments of the invention:

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location.

Any two components are "connected" when there is a combination of circuitry that can transfer signals from one of the components to the other. For example, two components are "connected" by any combination of connections between them that permits transfer of signals from one of the components to the other.

A "network' is a combination of circuitry through which a connection for transfer of data can be established between two components.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be a storage medium.

A "storage medium access device" is a device that includes circuitry that can access data on a data storage medium. Examples include drives for reading magnetic and optical data storage media.

"Memory circuitry" or "memory" is any circuitry that can store data, and may include local and remote memory and input/output devices. Examples include semiconductor ROMs, RAMs, and storage medium access devices with data storage media that they can access.

A "processor" is a component of circuitry that responds to input signals by performing processing operations on data and by providing output signals. A processor may include one or more central processing units or other processing components.

A processor performs an operation or a function "automatically" when it performs the operation or function independent of concurrent human control.

An "instruction" is an item of data that a processor can use to determine its own operation. A processor "executes" a set of instructions when it uses the instructions to determine its operations.

To "obtain" or "produce" an item of data is to perform any combination of operations that begins without the item of data and that results in the item of data.

An item of data "indicates" a thing, an event, or a characteristic when the item has a value that depends on the existence or occurrence of the thing, event, or characteristic or on a measure of the thing, event, or characteristic.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

"User input circuitry" is circuitry for providing signals based on actions of a user. User input circuitry can receive signals from one or more "user input devices" that provide signals based on actions of a user, such as a keyboard or a mouse. The set of signals provided by user input circuitry can therefore include data indicating mouse operation and data indicating keyboard operation.

An "image output device" is a device that can provide output defining an image. A "display" is an image output device that provides information in a visible form. To "present an image" on a display is to operate the display so that a human can perceive the image.

A machine has a "user interface" when the machine is connected or connectable to devices through which the machine can provide information to a user and can receive information from the user. For example, the machine could provide information through a display and could receive information from the user through one or more user input devices.

An item of data "defines" an image when the item of data includes sufficient information to produce the image.

A "page" is an image that can be perceived as a single page of a form or a sheet. A "web page" is a page that satisfies the constraints applicable to the World Wide Web (WWW) user interface.

An operation "creates" a page, such as a web page, when the operation produces an item of data defining the page. An operation "transmits" a page when the operation transmits an item of data defining the page. An operation "presents" a page when the operation presents one or more images that include information from an item of data defining the page.

A "selectable item" is a display feature that is perceived as a bounded display area that can be selected. Hyperlinks and menu items are examples of selectable items. A selectable item "indicates" a thing, an event, or a characteristic when the selectable item includes text or other visible information indicating the thing, event, or characteristic. A selectable item "identifies" a thing, an event, or a characteristic that is one of a set when the selectable item includes text or other visible information indicating the thing, event, or characteristic and not indicating any of the other elements in the set.

The term "select", when used in relation to a selectable item, means an action by a user that uniquely indicates the selectable item.

The term "machine" refers herein to a machine that includes at least one processor and its input/output circuitry.

The terms "server machine" (or "server"), "client machine" (or "client"), and "request" describe a relationship between machines that can be connected through a network: A "server machine" is a machine that performs services in response to "requests" it receives from one or more "client machines". In this context, a "request" is an item of data transferred from a client to a server that has a value indicating a service or operation to be performed by the server.

A connection between a server machine and a client machine is a "low bandwidth connection" in a given context if the connection has insufficient capacity to transfer items of data at a desired rate with perfect fidelity. The capacity of the connection may be limited, for example, by software or hardware constraints, with storage capacity being one example of a hardware constraint that can reduce capacity. In some contexts, a low bandwidth connection is any connection with a transfer speed below 56 kilobits per second. In contexts in which items of data are transferred for presentation to a user, a low bandwidth connection could be a connection that is not always able to transfer items of data at a sufficient speed to obtain the intended perceptual effect.

An "e-mail service" is a service provided by a server machine by which the server machine can transfer a human-readable message, referred to as an "e-mail message", electronically from a client machine, referred to as the "sending machine", to one or more client machines, referred to as "recipient machines". An e-mail message is typically composed through a user interface provided by the sending machine and is typically read through a user interface provided by a recipient machine.

An "e-mail item" is an item of data that defines an e-mail message. An e-mail item can be transferred from a sending machine to a server machine and from a server machine to a recipient machine. An e-mail item may include "headers" or "fields", such as "To:", "Cc:", "Subject:", and so forth.

As used herein, a "template" is an item of data that includes information that can be used in performing a server action. The information within a template may be organized into "fields", in which each field includes an item of data.

FUNCTIONAL OVERVIEW

Techniques are provided to reduce the amount of input required by users of clients. By reducing the amount of required input, the potential for errors is reduced, as is the burden of entering the input. Reducing the burden of entering the input may be significant, for example, when the user is using a device with a relatively awkward input mechanism.

According to one embodiment, the techniques involve the use of templates. When a user requests performance of an operation that requires user input, the user is presented with an option to select a template. The template includes input that has already been entered by the user (presumably using a client that has a relatively sophisticated input mechanism).

Within the template, various items of previously-entered user input are associated with fields defined for the template. The fields may be "editable" or "non-editable". If a field is editable, then when the user uses the template the user is prompted to enter input for the field. If a previously-entered user input item has been specified for the editable field, then the previously-entered user input item is sent to the user's client device as a "candidate" value for the field. The user may simply select a control to use the candidate value, or the user may user the input mechanism of the device to revise the candidate value as desired. When a template is used, the values specified for non-editable fields of the template may be used without even prompting the user about the field, and without transmitting the previously-entered value for the field to the client device. This may save a significant amount of time when, for example, the previously-entered value includes a large amount of data (e.g. a long text or a graphic) and the client has a low-bandwidth connection to the server.

After the user has provided values for all of the editable fields of a template (either by entering the values or by selecting the candidate values), the server performs the requested operation using the values specified for the template's fields. When the operation is responding to an email, for example, the server may generate a response email that includes boilerplate text associated with a non-editable field of the template, a graphic attachment associated with a non-editable field of the template, an email address value associated with an editable field for which a candidate value was provided, and a "p.s." line associated with an editable field for which no candidate value was provided.

SYSTEM OVERVIEW

Figure 2:
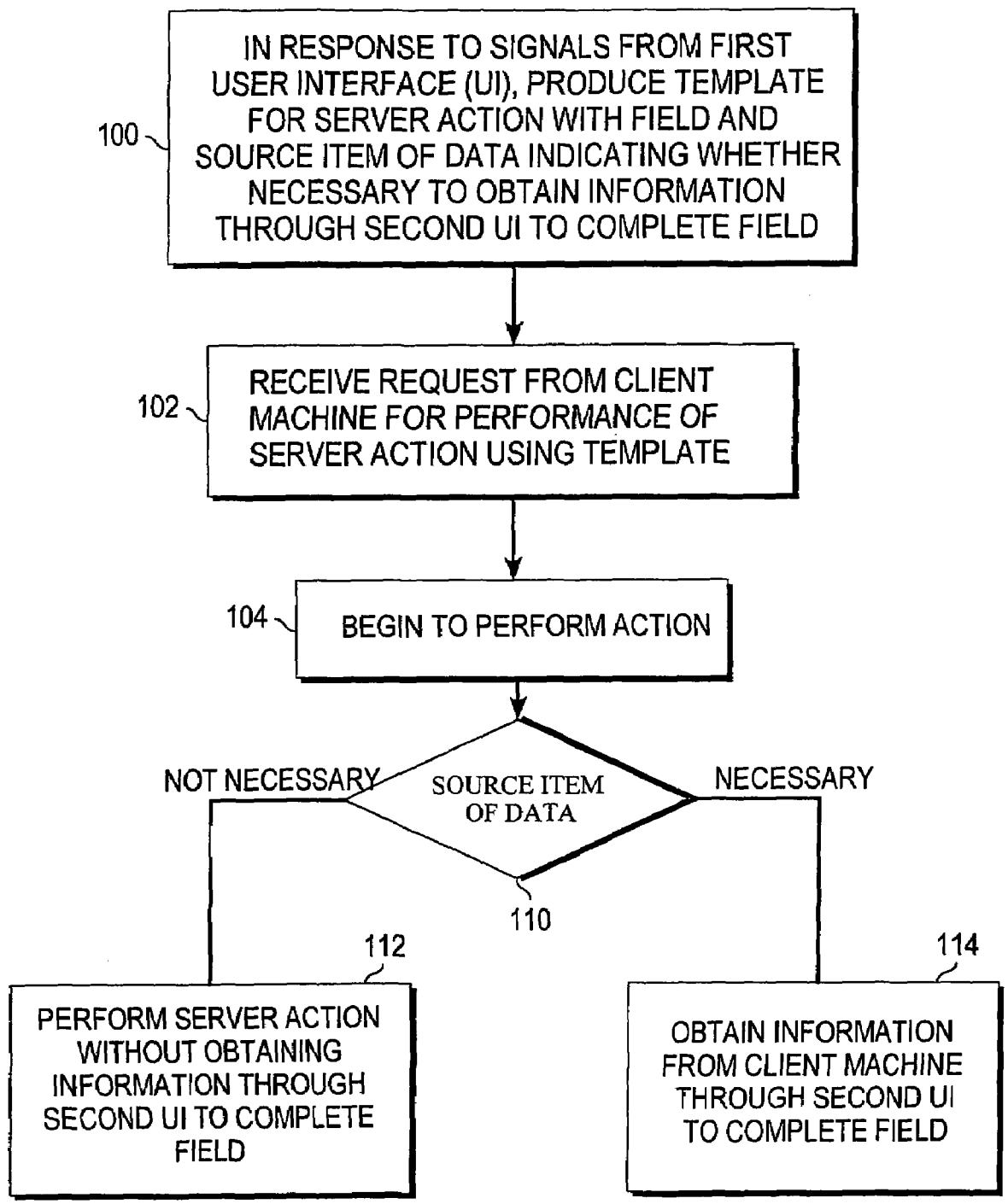
FIG. 2 is a flow chart of a general method by which a server machine performs a server action using a template.
Figure 3:
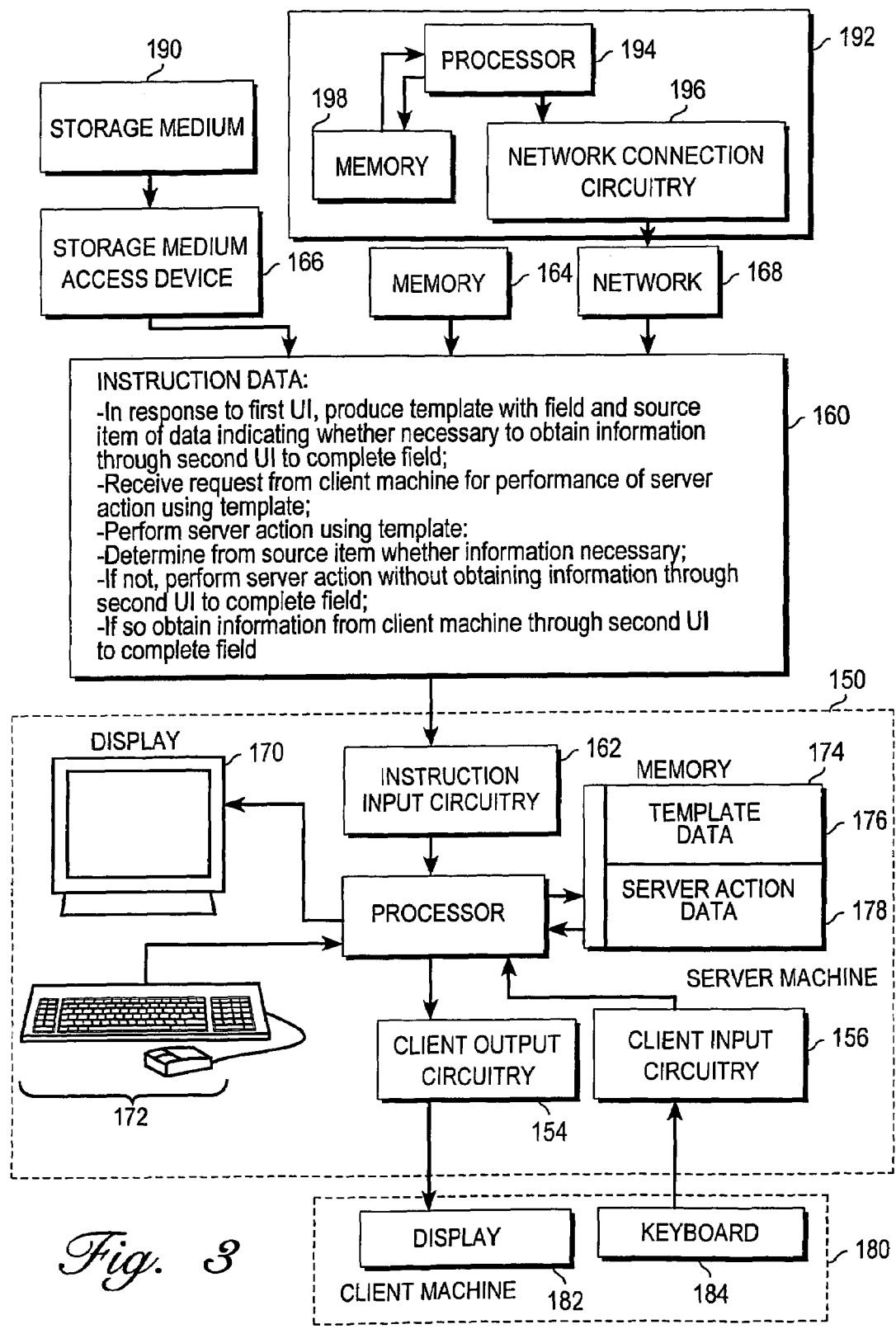
FIG. 3 is a schematic diagram showing general components of a system in which a server machine can perform server actions using templates.

FIGS. 1-3 show a system implemented according to one embodiment of the invention. In FIG. 1, server machine 10 performs server actions such as operations that create messages, schedule appointments, or submit database queries. As shown, server machine has first user interface 12 for interactively producing templates and second user interface 14 provided through client machine 16. Second user interface 14 is for obtaining information for server actions using templates.

In an operation designated by a circled 1, server machine 10 responds to signals received through first user interface 12, producing template 20 for use in performing server actions. Template 20 includes a field and a attribute data indicating whether it is necessary to obtain information through second user interface 14 to complete the field.

In an operation designated by a circled 2, server machine 10 receives request 22 from client machine 16, a request for performance of a server action using template 20.

In an operation designated by a circled 3, server machine 10 responds to request 22 by performing server action 24 using template 20. In performing server action 24, server machine 10 determines from the attribute data in template 20 whether it is necessary to obtain information to complete the field in template 20. If not, server machine 10 performs server action 24 without obtaining information through second user interface 14 to complete the field. If so, however, server machine 10 performs an operation designated by a circled 3', obtaining information from client machine 16 through second user interface 14 to complete the field.

In FIG. 2, the act in box 100, in response to signals received through a first user interface, produces a template for use in performing server actions. The template includes a field and a attribute data indicating whether it is necessary to obtain information through a second user interface to complete the field.

The act in box 102 receives a request from a client machine for performance of a server action using the template produced in box 100.

The act in box 104 responds to the request in box 102 by beginning to perform the server action.

During performance of the server action, the act in box 110 branches by determining from the attribute data whether it is necessary to obtain information to complete the field in the template.

If it is not necessary to obtain information, the act in box 112 performs the server action without obtaining information through the second user interface to complete the field.

If it is necessary to obtain information, the act in box 114 obtains information from the client machine through the second user interface to complete the field.

Server machine 150 in FIG. 3 includes processor 152 connected for receiving signals from a user's client machine 180 through client input circuitry 154 and for providing signals to client machine 180 through client output circuitry 156.

Processor 152 is also connected for receiving instruction data 160 indicating instructions through instruction input circuitry 162, which can illustratively provide instructions received from connections to memory 164, storage medium access device 166, or network 168.

Processor 152 is also connected for providing a first user interface through appropriate output and input devices, as illustrated by display 170 and keyboard/mouse 172.

Finally, processor 152 can also be connected to memory 174, illustratively storing template data 176 and server action data 178.

Processor 152 can also provide a second user interface through appropriate output and input devices in client machine 180, which illustratively includes display 182 and keyboard 184.

In executing the instructions indicated by instruction data 160, processor 152 responds to signals received through a first user interface, producing a template for use in performing server actions. The template includes a field and a attribute data indicating whether it is necessary to obtain information through a second user interface to complete the field. Processor 152 receives a request from a client machine for performance of a server action using the template, and responds to the request by performing the server action. In doing so, processor 152 determines from the attribute data whether it is necessary to obtain information to complete the field in the template. If not, processor 152 performs the server action without obtaining information through the second user interface to complete the field. But if so, processor 152 obtains information from the client machine through the second user interface to complete the field.

Processor 152 could obtain template data 176 and server action data 178, respectively defining a template and a server action performed using the template.

As noted above, FIG. 3 illustrates three possible sources from which instruction input circuitry 162 could receive data indicating instructions——memory 164, storage medium access device 166, and network 168.

Memory 164 could be any conventional memory within server machine 150, including random access memory (RAM) or read-only memory (ROM), or could be a peripheral or remote memory device of any kind. For example, memory 164 and memory 174 could be implemented in a single memory device.

Storage medium access device 166 could be a drive or other appropriate device or circuitry for accessing storage medium 190, which could, for example, be a magnetic medium such as a set of one or more tapes, diskettes, or floppy disks; an optical medium such as a set of one or more CD-ROMs; or any other appropriate medium for storing data. Storage medium 190 could be a part of server machine 150, a part of another server or other peripheral or remote memory device, or a software product. In each of these cases, storage medium 190 is an article of manufacture that can be used in server machine 150. Data units can be positioned on storage medium 190 so that storage medium access device 166 can access the data units and provide them in a sequence to processor 152 through instruction input circuitry 162. When provided in the sequence, the data units form instruction data 160, indicating instructions as illustrated.

Network 168 can provide instruction data 160 received from machine 192. Processor 194 in machine 192 can establish a connection with processor 152 over network 168 through network connection circuitry 196 and instruction input circuitry 162. Either processor could initiate the connection, and the connection could be established by any appropriate protocol. Then processor 194 can access instruction data stored in memory 198 and transfer the instruction data over network 168 to processor 152 so that processor 152 can receive instruction data 160 from network 168. Instruction data 160 can then be stored in memory 174 or elsewhere by processor 152, and can be executed.

The general features described above could be implemented in numerous ways on various server machines to perform server actions using templates. The initial implementation described below has been successfully implemented on several computer CPU architectures and operating systems, including Microsoft Windows NT 4.0/Intel x86, Sun Solaris 7/Intel x86, Sun Solaris 7/Sun UltraSPARC running atop an Apache 1.3 Web server using the Apache JServ module to run a custom set of servlets compiled from Java programming language source code. The initial implementation described below uses the WAP (Wireless Application Protocol) protocols, including WML (Wireless Markup Language) 1.0 and WML 1.1, to present information to and receive information from mobile client devices.

SYSTEM ARCHITECTURE

According to one embodiment, a server computer exchanges information with client machines that are cellular telephones or PDAs, providing access to information through a network. The server provides a number of services to users of the client machines, including but not limited to access to calendars; access to electronic mail folders, messages, and attachments such as documents; access to chat rooms; instant messaging; and access to address books. The server can reformat all information for display in a manner appropriate to the information, the client machine, and the user.

The server can provide secure wireless access directly to corporate and personal information, providing transparent, ubiquitous, and live management of calendars, e-mail, chat rooms, instant messaging, address books, and other server-based tools. As a result, a user can have one e-mail address, one calendar, and one address book no matter where the user is. A user with access to a client machine can work directly on his or her own network without synchronizing information among various intermediary networks. The user's network identity can be portable and unbounded.

Figure 4:
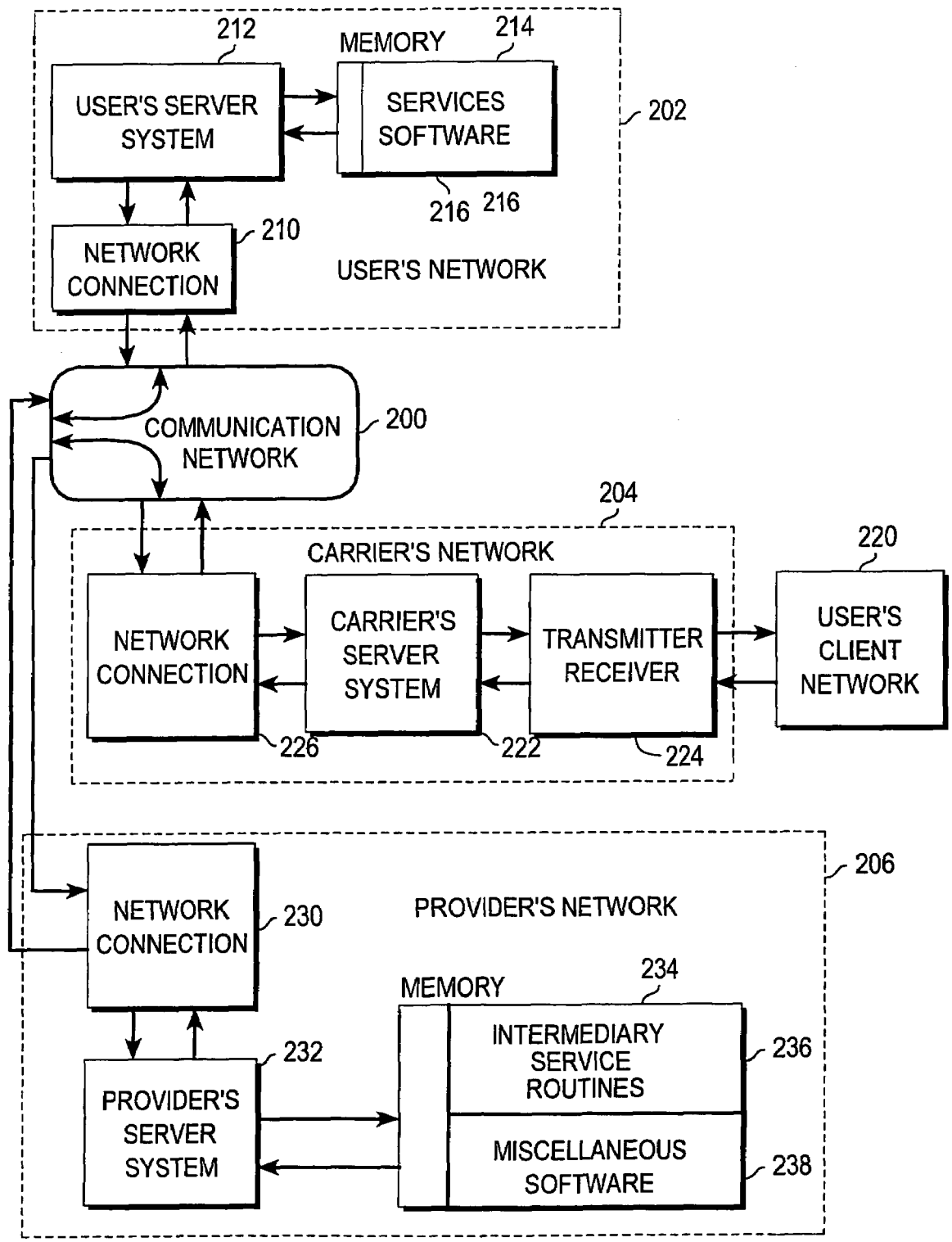
FIG. 4 is a schematic diagram showing components of a system in which an intermediary server (IMS) provides services to a user of a client machine.

FIG. 4 shows an architecture for wireless access to an individual's primary server that eliminates the need for separate identities. In the illustrated architecture, a wireless device becomes a live terminal directly linked to a network in a secure fashion. Therefore, it is irrelevant whether the individual user is accessing e-mail, a calendar, or other services from a desktop personal computer directly connected to the network, from a laptop or other portable computer linked to the network by a landline, or from a wireless device such as a cellular phone, PDA, or interactive pager.

In FIG. 4, communication network 200 provides communication links between three components—user's network 202, carrier's network 204, and provider's network 206. These components can be implemented with conventional techniques, except as noted below, and communication network 200 could be the public Internet, a private intranet, or another suitable communication network.

User's network 202 can be a conventional intranet or a conventional network of an Internet service provider through which a user has access to communication network 200. Network 202 includes network connection 210 and user's server system 212, which could include one or more server machines providing local and remote users with conventional network services such as an IMAP4 server for mail storage, a POP3 server for SMTP mail transmission, an LDAP server for directory or address book maintenance, a chat server, and so forth. Memory 214 illustratively stores services software 216 which a server machine could execute to provide services.

Carrier's network 204 can be a conventional network of a communication provider such as a telephone provider, cellular provider, paging company, etc., through which the user has communication services using client machine 220. Client machine 220 could, for example, be a wireless telephone, a PDA, a laptop or other portable computer, a pager, or any other machine capable of functioning as a client communicating with carrier's server system 222 in carrier's network 204 through transmitter/receiver 224. In the current implementation, client machine 220 has been successfully implemented with a conventional wireless telephone such as a Motorola P7389 or a Nokia 7110 executing a conventional Wireless Markup Language (WML) browser such as Phone.com's UP Browser 3.1 or UP Browser 4.0, and experiments have shown that client machine 220 could be implemented with a PDA such as a Palm Pilot V, but client machine 220 could be any other suitable machine with any other suitable user interface. The link between client machine 220 and transmitter/receiver 224 could thus be implemented with WAP or any other suitable protocol and could be provided over a wireless, wired, or hybrid connection.

In the architecture in FIG. 4, carrier's network also includes network connection 226, to provide connection between client machine 220 and communication network 200. Provider's network 206 similarly includes network connection 230. Communications between network connections 210, 224, and 230 can be implemented in a conventional manner, and can be protected using a Virtual Private Network (VPN) or another suitable protocol for providing secure links through communication network 200. Each of the Internet connections can be implemented with a firewall and other appropriate security protections.

Provider's network 206 also includes provider's server system 232, which can be implemented with one or more conventional machines such as a Sun Microsystems Enterprise 450. Machines in provider's server system 232 can provide conventional network services such as an Internet Mail Access Protocol 4 (IMAP4) server or other appropriate server for mail storage and retrieval, a POP3 server employing Simple Mail Transfer Protocol (SMTP) or other appropriate server for mail transmission, a Lightweight Directory Access Protocol (LDAP) server or other appropriate server for directory or address book maintenance, a chat server, and so forth. In addition, in the current implementation, provider's server system 232 provides an intermediary server (IMS) implemented with an Apache 1.3 Web server using the Apache JServ module running a custom set of servlets. Memory 234 illustratively stores intermediary services software 236 which a server machine could execute to provide intermediary services and miscellaneous software 238 which a server machine could execute to provide other services or to perform other functions.

Figure 5:
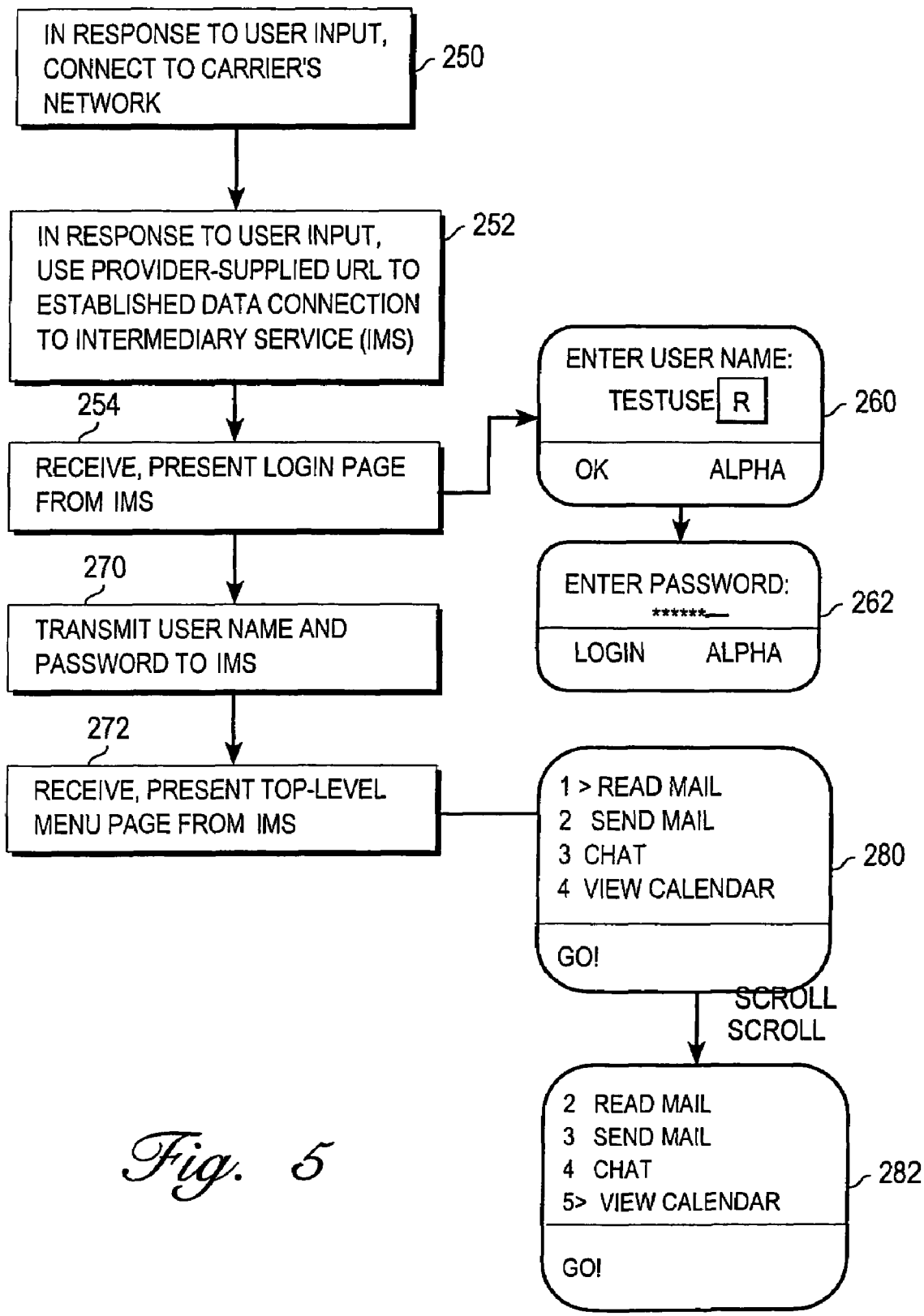
FIG. 5 is a flow chart showing operations of a client machine in establishing connection to the IMS in the system of FIG. 4.

As suggested by the bidirectional arrows inside communication network 200, the IMS acts as an intermediary during communication between client machine 220 and user's server system 212. FIG. 5 illustrates operations of client machine 220 in establishing connection with the IMS, making it possible for the user to request intermediary services.

In box 250, in response to user input, client machine 220 establishes connection to carrier's network 204. This can be accomplished in a conventional way, such as by transmitting a dial-in number that the user manually enters or selects, such as from a menu showing numbers stored in memory of client machine 220.

When connected to carrier's network 204, in response to further user input, client machine 220 uses a provider-supplied Universal Resource Locator (URL) to establish a data connection to the IMS, as shown in box 252. Here again, the user can manually enter the URL or can select it, such as from a menu of stored URLs. A server in carrier's server system 222 responds to the URL by establishing the data connection between client machine 220 and the IMS, performing conventional operations, and submits the URL to the IMS.

In response to the URL, the IMS sends a WML login or authentication page to client machine 220, enabling the user to log into the IMS. Client machine 220 receives and presents the login page, in box 254. For example, client machine 220 can present a first part of the login page requesting that the user enter a user name, as shown by display image 260. When the user has entered a user name, such as by pressing the numeric buttons on the keypad of a wireless telephone, the user can press a button adjacent the "OK" label to store the user name temporarily and to obtain display of a second part of the login page. In response, client machine 220 can present the second part of the login page requesting that the user enter a password, as shown by display image 262. When the user has entered a password, illustratively disguised by asterisks, the user can press a button adjacent the "Login" label to request that the client machine 220 transmit the user name, here "testuser", and the password to the IMS.

In response to the user pressing the button labeled "Login", client machine 220 transmits the user name and password to the IMS using the standard WML and Hypertext Transfer Protocol (HTTP) mechanism "POST", as shown in box 270.

In response to the user name and password, the IMS uses them to access a database of authorized users. If the user name and password are both valid and match, data is stored indicating that the user is "logged in". Then, the IMS sends a WML top-level menu page to client machine 220, listing the main set of operations the user can perform through the IMS.

Login could be implemented in various ways other than with the specific features shown in boxes display images 260 and 262 and in box 270. For example, a variation has been implemented in which a first part of the login page requests that the user enter a personal identification number (PIN) and a second part requests that the user enter a user identifier (ID). In this implementation, the PIN and ID are used in login rather than a user name and password.

Client machine 220 receives and presents the top-level menu page, in box 272. For example, client machine 220 can present a first part of the top-level menu page showing the beginning of the list of operations, as shown by display image 280. If the device's display is not large enough to display all of the menu items, when the user requests scrolling, such as by pressing a scroll button, client machine 220 can present a second part of the top-level menu page with a subsequent part of the list of operations, as shown by display image 282.

As illustrated, client machine 220 presents the top-level menu page as a list of numbered lines, each line including a short description of a service such as "Read mail", "Send mail", "Chat", "View calendar", and "Look up name". A top-level menu page could include various other such lists and items could be presented differently; for example, in a variation on the illustrated implementation, the lines of the top-level menu page include the following descriptions: "Read mail", "Send mail", "Chat", "View calendar", "Look up name", and "Log out", which can be selected to log out directly, and the items are presented without numbers before them.

In the illustrated implementation, client machine 220 also presents a ">" symbol as a cursor to indicate the current selection, with the first item in the list being the default current selection. The user can then change the current selection by requesting scrolling to move the ">" symbol up or down until it is positioned to the left of a desired operation. When a desired operation is selected, the user can press a button adjacent the "Go!" label to request that the client machine 220 transmit a request for the desired operation to the IMS.

The term "scroll", as used herein, thus refers to two related operations that can be implemented together or separately. One operation scrolls by moving a display image with respect to a virtual workspace such as a page; an example is upward or downward scrolling as illustrated by display images 280 and 282. Another operation scrolls by moving a cursor that indicates current selection from one selectable item to another; an example is movement of the ">" symbol from one item in a menu to another, as shown in display images 280 and 282. Scrolling can generally be implemented using up-down keys or pads or using next-previous buttons or buttons adjacent next-previous labels. In response to an up or down signal, client machine 220 can move the cursor to the next selectable item in the indicated direction unless the cursor is not currently in the display image, in which case client machine 220 can advance the display image position by one line in the indicated direction.

The top-level menu page is thus the starting point for all IMS capabilities. The manner in which the IMS responds to requests for operations from the top-level menu in a current implementation is described below.

TOP-LEVEL INTERMEDIARY SERVER OPERATIONS

The five operations on the menu illustrated by display images 280 and 282 have been implemented as follows in a current implementation.

Read mail

Figure 6:
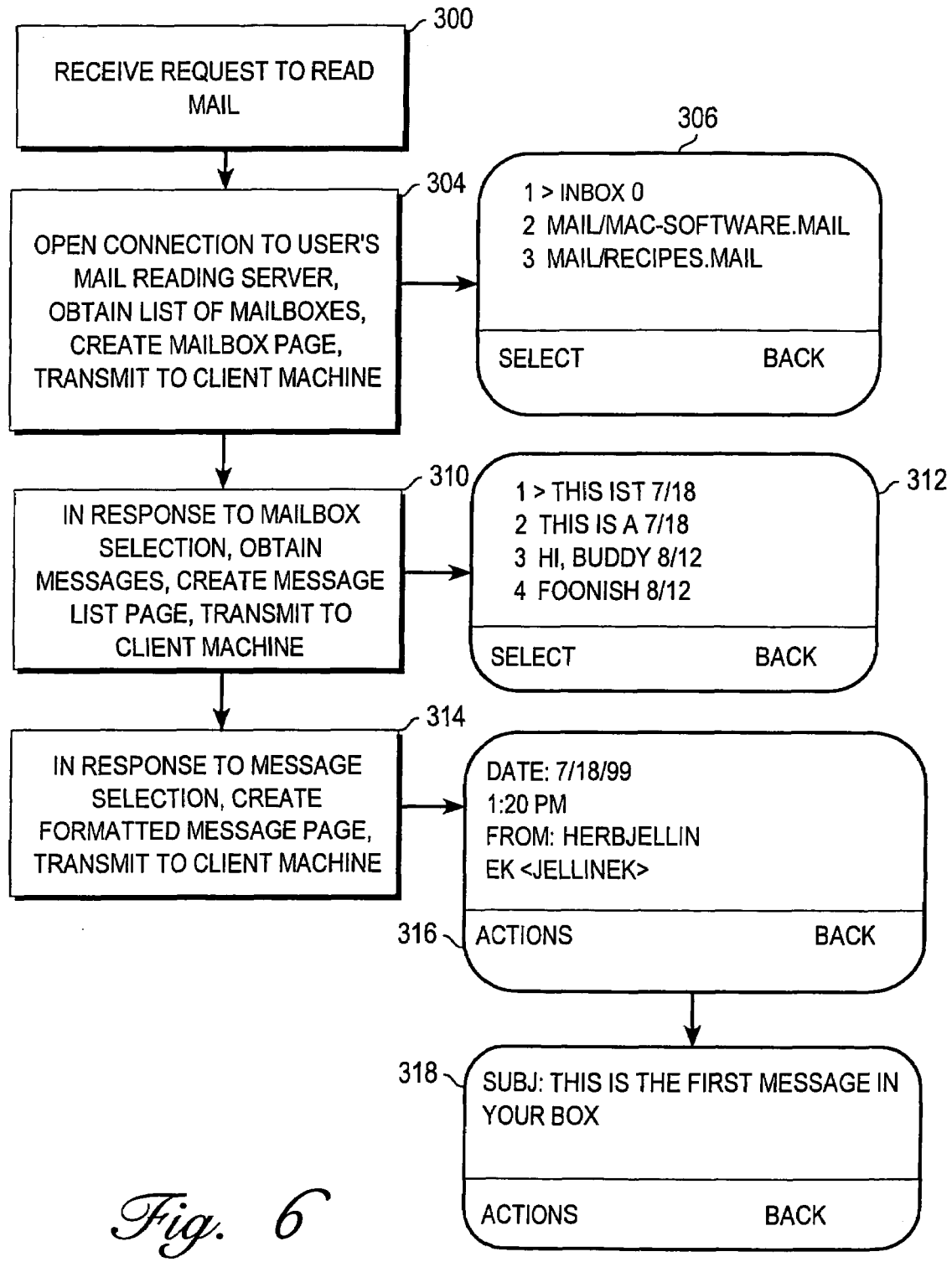
FIG. 6 is a flow chart showing operations of the IMS of FIG. 4 in response to a request to read mail.

In the current implementation, the top-level menu always includes the "Read mail" operation. FIG. 6 illustrates acts performed by the IMS in response to a request for the "Read mail" operation. In general, each act performed by the IMS involves the execution of one or more servlets.

In box 300, the IMS receives the request for the "Read mail" operation from client machine 220.

In response to the request received in box 300, the IMS opens a secure connection to user's network 202 using Transport Layer Security (TLS) such as a Secure Socket Layer (SSL) 3.0-based tunnel. Many conventional IMAP4 and other servers are able to maintain such a tunnel, or appropriate software could be loaded and run on user's server system 212 to maintain such a tunnel. Once the tunnel is established, the IMS has a secure connection across communication network 200 to user's server subsystem 212.

In order to perform the "Read mail" operation, the IMS opens a connection to the user's mail reading server, an IMAP4 server in the current implementation, in box 304. The IMS also obtains from the user's mail reading server a list of the user's mailboxes, and uses the list to create a WML mailbox list page. The IMS then transmits the mailbox list page to client machine 220.

Display image 306 is an example of how a mailbox list page appears when presented. As illustrated, client machine 220 presents the mailbox list page as a list of numbered items, each item including a mailbox name such as "Inbox", which is where new messages arrive; "Mail/mac-software.mail"; and "Mail/recipes.mail". As in box 280 in FIG. 5, client machine 220 also presents a ">" symbol as a cursor to indicate the current selection, with the first item in the list being the default current selection; in the illustrated example, the last mailbox name is truncated due to screen size, but when the user selects it by moving the cursor to it, the mailbox name can scroll horizontally to provide a full display of "Mail/recipes.mail". Client machine 220 also presents a number after the Inbox, indicating the number of new messages that have not yet been viewed, referred to as "unseen" new messages". In image 306, the Inbox has zero unseen new messages. When a desired mailbox is the current selection, the user can press a button adjacent the "Select" label to request that the client machine 220 transmit a request to view the messages in the selected mailbox to the IMS.

In box 310, the IMS responds to user selection of a mailbox by again connecting to the user's mail reading server to obtain the messages in the mailbox from the user's mail server. The IMS uses the messages to create a WML message list page, which it transmits to client machine 220.

A message list page could have any appropriate format. Display image 312 is an example of a message list page that is presented by client machine 220 as a list of numbered items, each item including a message's subject line, truncated if necessary, and the date of the message, or, if today's date, the message's time of creation. Alternatively, a message list page could be presented as a list in which the subject line is replaced, for example, by the message's "From" line. The user could choose the format of message list pages in advance through an appropriate user interface within user's network 202. As above, client machine 220 also presents a ">" symbol as a cursor to indicate the current selection, with the first item in the list being the default current selection. When a desired message is the current selection, the user can press a button adjacent the "Select" label to request that the client machine 220 transmit a request to view the selected message to the IMS.

In box 314, the IMS responds to user selection of a message by using the selected message to create a WML formatted message page, which it transmits to client machine 220.

A formatted message page could similarly have any appropriate format, although it is typically useful to create a concisely reformatted version that is optimized for the display constraints of client machine 220, such as a small screen. For example, as shown by display image 316, client machine 220 can present a first part of a formatted message page showing the beginning of a reformatted version of the message. If the device's display is not large enough to display all of the reformatted version, when the user requests scrolling, such as by pressing a scroll button, client machine 220 can present a second part of the formatted message page with a subsequent part of the list of operations, as shown by display image 318. Display images 316 and 318 illustrate a reformatted version that includes a list of items, each beginning with a subject such as "Date:", "From:", "Subj:", and so forth. The message's header lines can either be reformatted or suppressed altogether to better fit the screen and to minimize transmission time.

Send mail

In the current implementation, the top-level menu always includes the "Send mail" operation.

Figure 7:
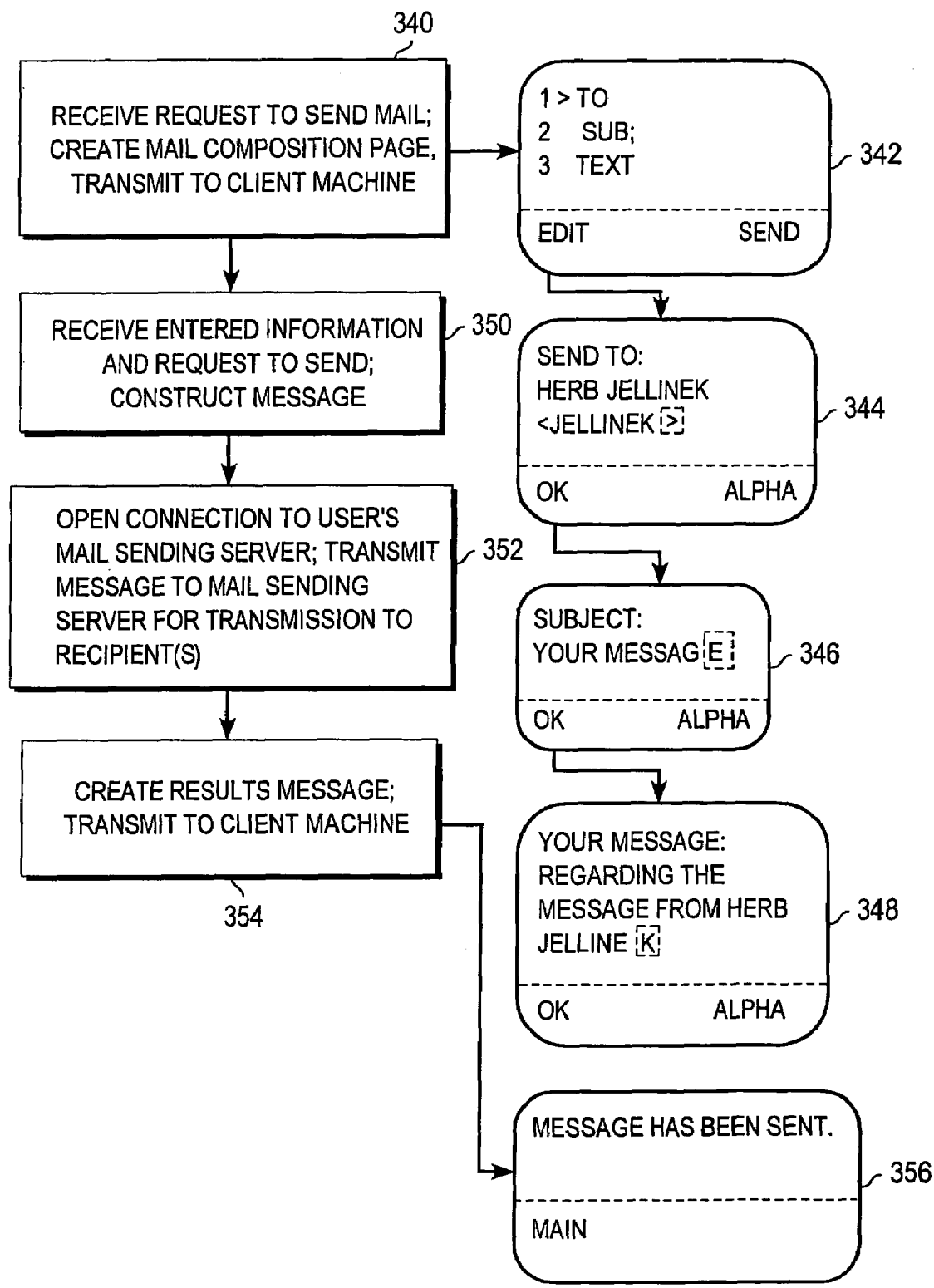
FIG. 7 is a flow chart showing operations of the IMS of FIG. 4 in response to a request to send mail.

FIG. 7 illustrates acts performed by the IMS in response to a request for the "Send mail" operation. As above, each act performed by the IMS involves the execution of one or more servlets.

In box 340, the IMS receives the request for the "Send mail" operation from client machine 220. In response, the IMS creates a mail composition page and transmits it to client machine 220.

An example of a mail composition page in response to a "Send mail" request is shown by display images 342, 344, 346, and 348. A first part of the page, shown in image 342, provides a list of numbered items, each item including a brief description of a message field that can be edited. As above, client machine 220 also presents a ">" symbol as a cursor to indicate the current selection, with the first item in the list being the default current selection. When a desired message field is the current selection, the user can press a button adjacent the "Edit" label to request that client machine 220 present another part of the mail composition page so that the user can edit the selected message field. When the user completes editing, the user can press a button adjacent the "Send" label to request that client machine 220 send the edited message fields and a request to send the message to the IMS.

A second part of the page, shown in image 344, is presented when the user presses the "Edit" button when the "To" message field is selected. Image 344 elicits the address to which a message is to be sent; in the example, the user has entered "Herb Jellinek <Jellinek>" or this address has been included in the page by default, allowing the user to change it. When the user indicates the address is complete by pressing a button adjacent the "OK" label, client machine returns to the first part of the page, as shown in image 342, and the user can then scroll the cursor to select another message field.

A third part of the page, shown in image 346, is presented when the user presses the "Edit" button when the "Subj" message field is selected. Image 346 elicits the subject of the message; in the example, the user has entered "Your Message". When the user indicates the subject is complete by pressing a button adjacent the "OK" label, client machine returns to the previously shown part of the page, similar to the part shown in image 342, and the user can then scroll the cursor to select another message field.

A fourth part of the page, shown in image 348, is presented when the user presses the "Edit" button when the "Text" message field is selected. Image 348 elicits the body of the message; in the example, the user has entered "Regarding the message from Herb Jellinek". When the user indicates the text is complete by pressing a button adjacent the "OK" label, client machine returns to the previously shown part of the page, similar to the part shown in image 342, and the user can then scroll the cursor to select another message field.

When the user has completed all the fields as desired, the user can press a button adjacent the "Send" label to request that a message be sent in accordance with the entered information.

In box 350, the IMS receives the entered information and the request to send from box 340. In response, the IMS constructs a message in accordance with the entered information and in the correct format to be sent.

The IMS opens a secure connection to user's server subsystem 212, as described above. In order to perform the "Send mail" operation, the IMS opens a connection to the user's mail sending server, an SMTP server in the current implementation, in box 352. The IMS then transmits the message to the user's mail sending server for transmission to the recipient(s).

Although the IMS could use an SMTP server in provider's server system 232 to transmit the message, this could be problematic because addresses local to user's network 202 would not be accessible.

Based on the result of the transmission, IMS then creates a results page and transmits it to client machine 220, in box 354. Display image 356 illustrates an example of a results page indicating that a message has been successfully sent. Other results pages could detail problems that occurred in delivering a message.

Chat

In the current implementation, the top-level menu could include the "Chat" operation. This operation is useful when one has immediate communication needs that e-mail or a voice telephone call cannot fulfill. For example, if one needs to consult a group of people or any single member of a group, interactive text chat may be a better solution.

To enable the IMS to provide the "Chat" service to a group of people, a counterpart chat server program must be running on User's Server System 212 or another network accessible to all of the people in the group. Similarly, to enable users of other computers to participate, their computers must be running a counterpart chat client program, which can, for example, provide a graphical user interface. The chat server and chat client programs can be implemented with conventional techniques, such as those used to implement commercially available chat software. The initial implementation uses conventionally implemented chat server and chat client programs that could be replaced by Yahoo! Messenger or AOL Instant Messenger with minimal change to the rest of the system.

Figure 8:
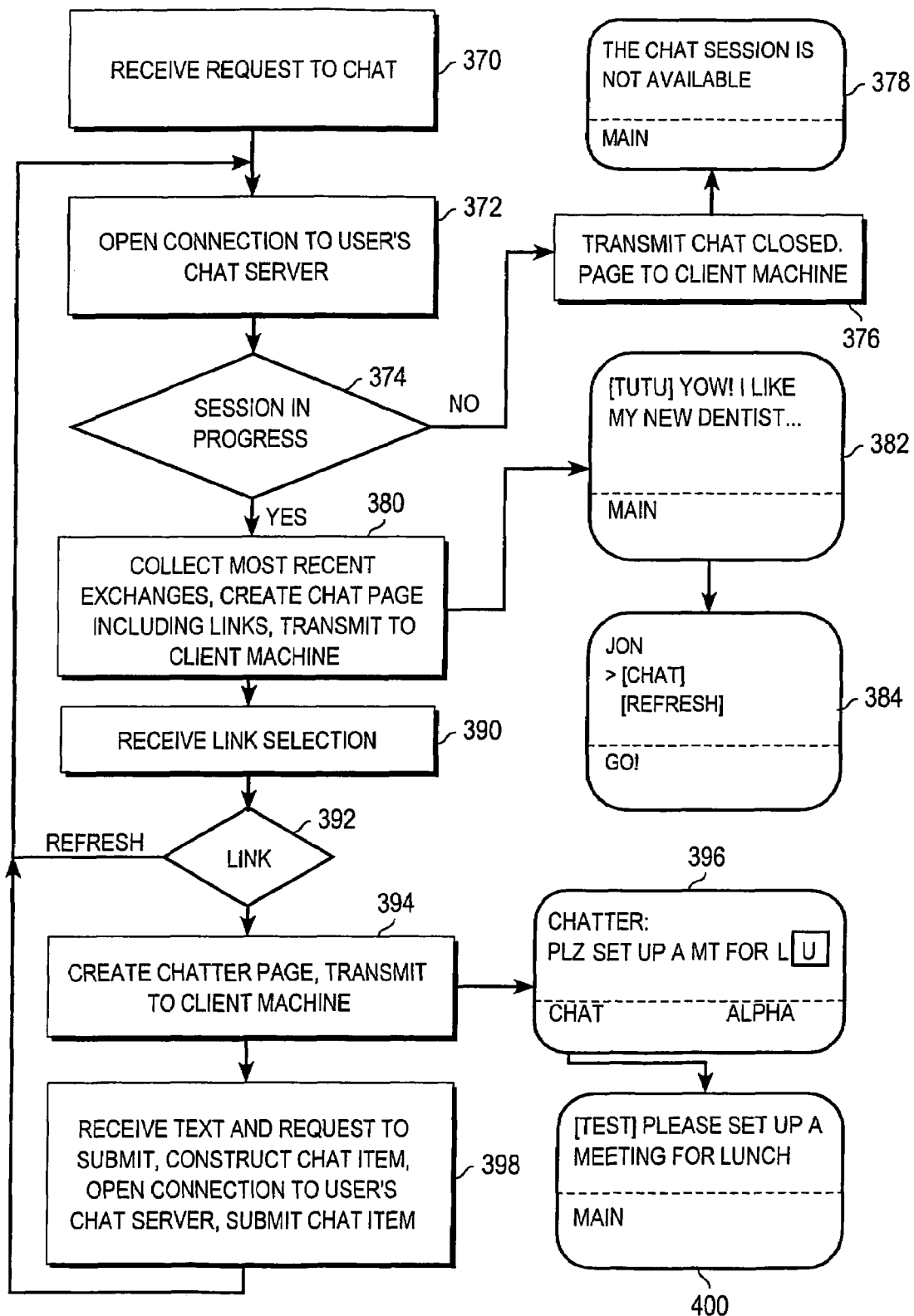
FIG. 8 is a flow chart showing operations of the IMS of FIG. 4 in response to a request to chat.

FIG. 8 illustrates acts performed by the IMS in response to a request for the "Chat" operation. As above, each act performed by the IMS involves the execution of one or more servlets. FIG. 8 also suggests acts performed by client machine 220, running a counterpart WAP client that supports the "Chat" service.

In box 370, the IMS receives the request for the "Chat" operation from client machine 220.

In response, the IMS opens a secure connection to user's server subsystem 212, as described above. In order to perform the "Chat" operation, the IMS opens a connection to the user's chat server, in box 372. Identifying information for a user's chat server can be stored in advance as part of the user's IMS profile. The IMS determines in box 374 whether a chat session is in progress and, if not, transmits a chat closed page to client machine 220 in box 376. Display image 378 illustrates an example of a chat closed page.

If a chat session is in progress, the IMS collects the most recent exchanges from the chat server, in box 380. Using the collected exchanges, the IMS creates a chat page, including links allowing a user to add some "chatter" to the conversation or view the latest chat. The link to view the latest chat is necessary because the "Chat" operation is not automatically updating, due to limitations in the current WAP standard-there is no way in WAP 1.1 to notify interested parties when the page they are viewing has been updated. The IMS transmits the chat page with included links to client machine 220.

An example of a chat page in response to a "Chat" request is shown by display images 382 and 384. A first part of the page, shown in image 382, shows an item of "chatter" that was collected in box 380. By scrolling, the user can reach a closing part of the page, shown in image 384, which shows the end of the final item of "chatter", followed by a list of links. The list includes a "Chat" link enabling the user to add "chatter" to the conversation and a "Refresh" link enabling the user to view an updated chat page. As above, client machine 220 also presents a ">" symbol as a cursor to indicate the current selection within the list, with the first link in the list being the default current selection. When a desired link is the current selection, the user can press a button adjacent the "Go!" label to request that the client machine 220 transmit a request to the IMS to follow the desired link.

In box 390, the IMS receives a request to follow a selected link, and in box 392, the IMS branches based on the link selected. If the "Refresh" link was selected, the IMS returns to box 372, reestablishing connection to the chat server. But if the "Chat" link was selected, the IMS creates a chatter page and transmits it to client machine 220, in box 394. Display image 396 illustrates an example of a chatter page, in which the user has entered a shorthand version of the text "Please set up a meeting for lunch" . If the user then presses a button adjacent the "Chat" label, client machine 220 transmits to the IMS a request to submit the expanded version of the entered text to the conversation.

In response to the request and the shorthand version of the text, the IMS expands the text and constructs a chat item using the text, in box 398. The IMS then contacts the user's chat server as in box 372 and submits the chat item. The IMS can then return to the test in box 374 and, if the chat item was successfully submitted, the chat page created in the next iteration of box 380 should include the submitted chat item, as illustrated by display image 400. The chat page shown in image 400 shows the user's "chat handle", a nickname which is "test" in the example, followed by the expanded version of the shorthand text from image 396.

View calendar

In the current implementation, the top-level menu always includes the "View calendar" operation. It is increasingly common for users to keep their personal schedules on a network server to make it easy for others to schedule appointments with them. Although there is not yet an Internet standard for networked calendars, conventional networked calendars implement the following simple functions: (i) Schedule a new appointment, given a date, start time, end time, and meeting description; (ii) delete an appointment, given a unique identifier such as an appointment number for the appointment; and (iii) list all appointments on a given day, and return a unique identifier such as an appointment number for each appointment. In the current implementation, the IMS provides a calendar service that includes these three functions.

Figure 9:
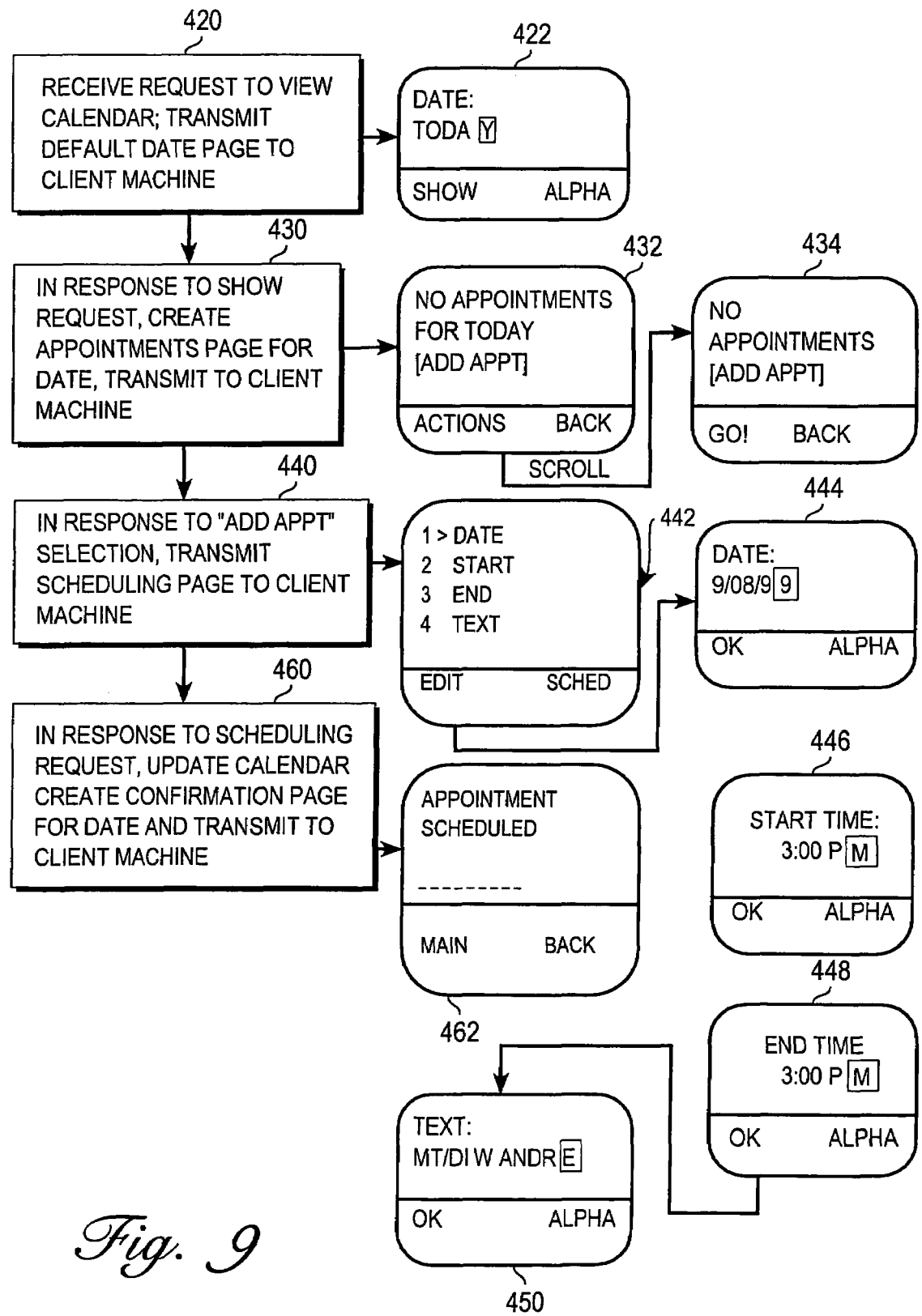
FIG. 9 is a flow chart showing operations of the IMS of FIG. 4 in response to a request to view calendar.

FIG. 9 illustrates acts performed by the IMS in response to a request for the "View calendar" operation. As above, each act performed by the IMS involves the execution of one or more servlets.

In box 420, the IMS receives the request for the "View calendar" operation from client machine 220. In response, the IMS transmits a default date page to client machine 220, requesting that the user indicate the desired calendar date and already completed with a default date that the user can enter by a single button push. Display image 422 illustrates an example of a default date page in which the default date is "today". The user can edit the default date page to include another date. When the desired date is on the default date page, the user can press a button adjacent the "Show" label to request that client machine 220 transmit a request to the IMS to show a list of appointments for the desired date.

In response to a request to show a list of appointments for a date, the IMS creates an appointments page for the date and transmits the appointments page to client machine 220. Display images 432 and 434 show an example of an appointments page. A first version of the page, shown in image 432, indicates that no appointments have been scheduled for today and includes a link labeled "Add appt" which can be followed to add an appointment. In a second version of the page, shown in image 434, the user has scrolled to position a ">" symbol as a cursor to indicate selection of the link labeled "Add appt". The user can press a button adjacent the "Go!" label to request that the client machine 220 transmit a request to the IMS to follow the selected link.

In box 440, the IMS responds to the request to follow the selected link by transmitting a scheduling page to client machine 220. Display image 442 illustrates an example of a first subpage of a scheduling page. The first subpage is presented by client machine 220 as a list of numbered items, each item including a short description of an item of information relating to an appointment. As above, client machine 220 also presents a ">" symbol as a cursor to indicate the current selection, with the first item in the list being the default current selection. When a desired item is the current selection, the user can press a button adjacent the "Edit" label to request an opportunity to edit the item.

Display images 444, 446, 448, and 450 illustrate a sequence of subpages of the scheduling page. Display image 444 shows a subpage in which the user has edited the "Date" item, entering the value "9/08/1999". The user may then press a button adjacent the "OK" label to return to the first subpage and select another item.

Display image 446 shows a subpage in which the user has edited the "Start time" item, entering the value "3:00 PM". As above, the user may again press a button adjacent the "OK" label to return to the first subpage and select another item.

Display image 448 shows a subpage in which the user has edited the "End time" item, entering the value "3:00 PM". As above, the user may again press a button adjacent the "OK" label to return to the first subpage and select another item.

Display image 450 shows a subpage in which the user has edited the "Text" item, entering a shorthand version of the text "Meeting/dinner with Andre". As above, the user may again press a button adjacent the "OK" label to return to the first subpage and select another item.

When the user wishes to schedule an appointment, the user may press a button adjacent the "Sched" label in the first subpage. In response, client machine 220 transmits a request to the IMS to schedule an appointment according to the information entered in the scheduling page.

In response to the request, the IMS updates the calendar in accordance with the information entered in the scheduling page, in box 460. In updating the calendar, the IMS can expand the shorthand version of the text. The IMS also creates a confirmation page that can include an updated list of appointments for the selected date, and transmits the confirmation page to client machine 220.

Display image 462 illustrates a confirmation page which does not include an updated list of appointments. As in the other examples above, the user can press a button adjacent the "Main" label to return to the top-level menu.

Look up name

In the current implementation, the top-level menu always includes the "Look up name" operation. Users typically have one or more databases of information about other users, which may be referred to as address books, contact lists, or personal directories. As used herein, the term "address book" includes all of these types of databases.

A user will find it advantageous to keep a single copy of the user's address book on the user's network server, rather than incurring the extra work necessary to keep several versions that must be synchronized to make it easy for others to schedule appointments with them. The IMS makes it easy to keep a single address book by including the ability to interact with LDAP servers, which are designed to serve address book information to any client that speaks the LDAP protocol. Programs that speak the LDAP protocol include Netscape Messenger and Microsoft Outlook Express.

Figure 10:
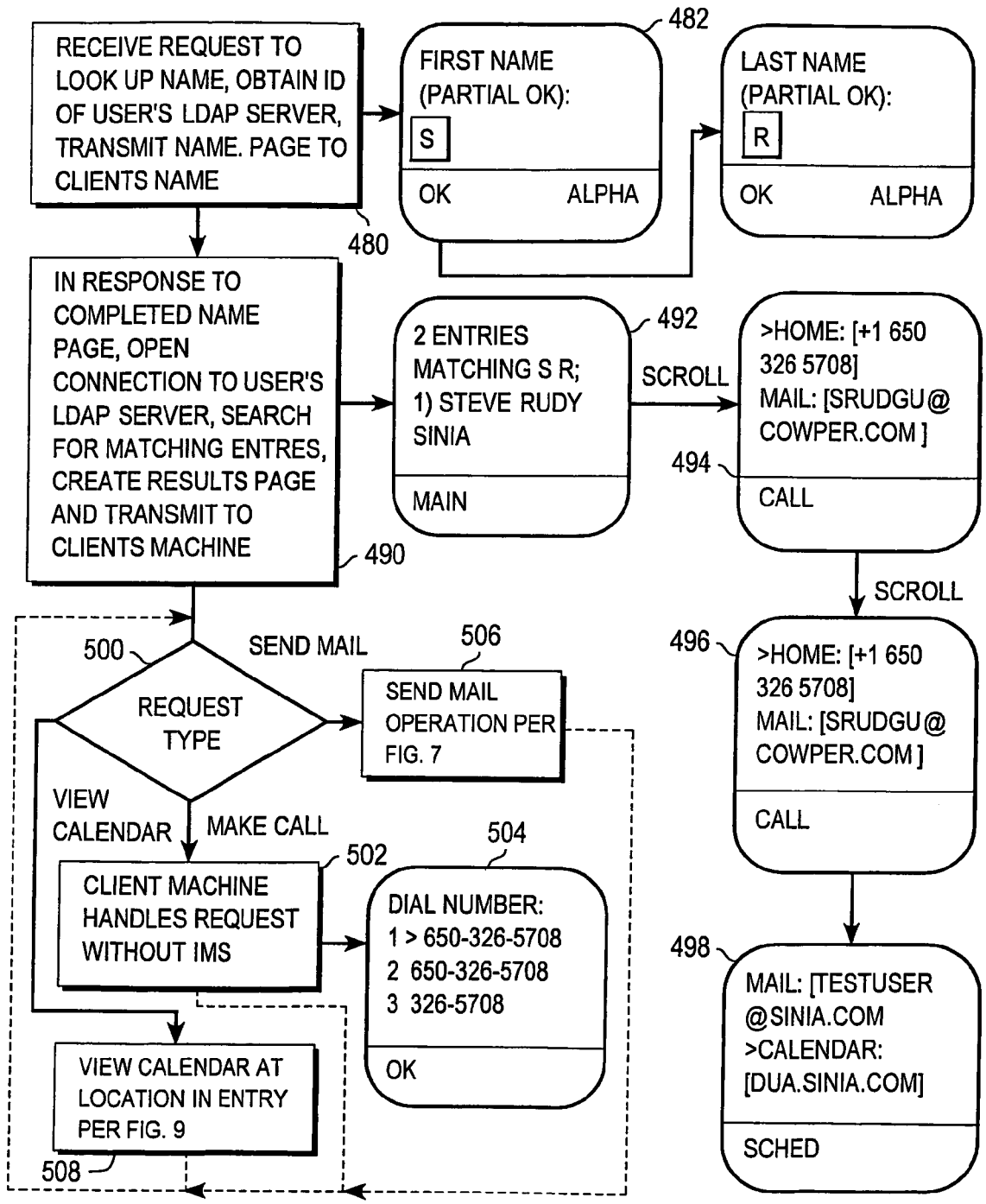
FIG. 10 is a flow chart showing operations of the IMS of FIG. 4 in response to a request to look up name.

FIG. 10 illustrates acts performed by the IMS in response to a request for the "Look up name" operation. As above, each act performed by the IMS involves the execution of one or more servlets.

In box 480, the IMS receives the request for the "Look up name" operation from client machine 220. In response, the IMS accesses previously stored information in memory 234 about the user to obtain an identifier (ID) of the user's preferred LDAP server and other parameters; the user could have loaded the previously stored information into memory 234 through a user interface provided by the IMS through user's server system 212. In addition, the IMS transmits a name page to client machine 220, allowing the user to enter a complete or partial desired name for searching the user's address book database.

Display images 482 and 484 illustrate an example of a name page in which the user has entered a partial first name (or given name) string and a partial last name (or surname) string. A first part of the name page, shown in display image 482, is headed "First Name (partial OK)", and the user has entered a first name string that includes only the character "s" in the example. The user can press a button adjacent the "OK" label in the first part of the name page to complete entry of the first name string and obtain a second part of the name page, shown in display image 484. The second part is headed "Last Name (partial OK)", and the user has entered a last name string that includes only the character "r" in the example. The user can press a button adjacent the "OK" label in the second part of the name page to complete entry of the last name string and to request that client machine 220 transmit a request to the IMS to search the user's address book database with the entered strings.

In response to a request to search the user's address book database with first and last name strings, the IMS opens a connection to the user's LDAP server and searches for entries with names that satisfy a matching criterion when compared with the entered strings, in box 490. The IMS creates a results page based on the results of the search and transmits the results page to client machine 220. In the current implementation, address book entries can include a person's name, a company name, a postal address, one or more e-mail addresses, a home telephone number, an office telephone number, a fax number, a pager number, a calendar location, a preferred chat session, and a server identifier. The IMS can use some of these items of information to create the results page, as described below, and can ignore other items.

The following two-part matching criterion has been successfully implemented in the IMS: Under a string input subcriterion, if the user enters strings that include no characters for both names, a result is returned indicating that no entries in the database match, because this is likely to be an input error. Otherwise a substring match subcriterion applies, so that an entry matches only if both its first name includes a substring that matches the entered first name string, disregarding case, and also its last name includes a substring that matches the entered last name string, again disregarding case. In the illustrated example, this matching criterion would be satisfied by all entries with "s" in the first name and "r" in the last name. If the user enters a string that includes no characters, i.e. an empty string, for one (but not both) of the names, then every entry would include a matching substring for that name, i.e. the empty substring.

Display images 492, 494, 496, and 498 show an example of a results page.

A first part of the results page, shown in image 492, indicates that the database includes two entries that match the entered strings, "s" and "r". The first part of the results page also shows the beginning of a list of the matching entries, in which each entry begins with a number and identifying information the IMS has extracted from the entry. In the illustrated example, the first entry's identifying information includes the person's name, "Steve Rudy", and the company name, "Sinia". Following the identifying information is a series of items from which the user can select to request actions.

Second and third parts of the results page, shown respectively in display images 494 and 496, can be reached by scrolling downward from the first part to position a ">" symbol as a cursor to indicate selection of one of two links labeled "Home" and "Mail". The link labeled "Home" includes the home telephone number from the entry, and the link labeled "Mail" includes one of the e-mail addresses from the entry. If the cursor indicates selection of the link labeled "Home", a "Call" label is also presented and the user can press a button adjacent the "Call" label to request that the client machine 220 request the standard WAP "make call" function. If the cursor indicates selection of the link labeled "Mail", a second "Mail" label is presented and the user can press a button adjacent the second "Mail" label to request a "Send mail" operation as described above in relation to FIG. 7 for the e-mail address in the link. As mentioned in relation to FIG. 7, image 344 would include an e-mail address by default, in this case the selected e-mail address from the results page.

A fourth part of the results page, shown in display image 498, can be reached by scrolling downward from the second or third part and by then positioning the cursor to indicate selection of a link labeled "Calendar". With this selection, a "Sched" label is also presented and the user can press a button adjacent the "Sched" label to request the "View calendar" operation described above in relation to FIG. 9, but accessing the calendar at the location from the entry rather than the user's own calendar.

While the results page is being presented, the IMS thus branches based on the type of request the user makes, in box 500. Some types of requests are illustrated in FIG. 10, though others could also be available.

If the user requests a "make call" function, client machine 220 handles the request without the IMS, in box 502. Display image 504 illustrates a make call page that client machine 220 could store at an appropriate location such as wtai://wp/mc and could present in response to the user's request; as shown, image 504 includes a list of dialing options from which the user can select by positioning a cursor. Then, the user can press a button adjacent an "OK" label to request that client machine 220 place a call using the selected dialing option through carrier's network 204. While client machine 220 has control of the make call operation, it could terminate connection to the IMS, and the IMS could wait for reconnection by client machine 220, while saving the user's current state in the IMS user interface. For example, a phone browser running on client machine 220 could reconnect to the IMS automatically upon hang up or could again present the results page as in image 492, allowing the user to press a button adjacent the "Main" label to initiate reconnection.

If the user requests a "Send mail" operation or a "View calendar" operation, the IMS provides the requested operation, in box 506 or box 508, respectively.

When the response to each request is completed, client machine 220 can again display the results page, either immediately or after another log in operation, so that the user can make another request, as suggested by the dashed lines from boxes 502, 506, and 508 back to box 500. For example, the user could begin by requesting a "make call" function to the home telephone number in display image 494; after placing the telephone call, the user could return to display image 496 and request a "Send mail" operation to the e-mail address in the entry, or, alternatively, the user could return to display image 498 and request a "View calendar" operation accessing the calendar at the location in the entry.

USING TEMPLATES

Templates may be used in many ways within the context of the top-level IMS operations described above. In an initial implementation, the template feature is implemented as an extension of the "Read mail" and "Send mail" operations described above.

Figure 11:
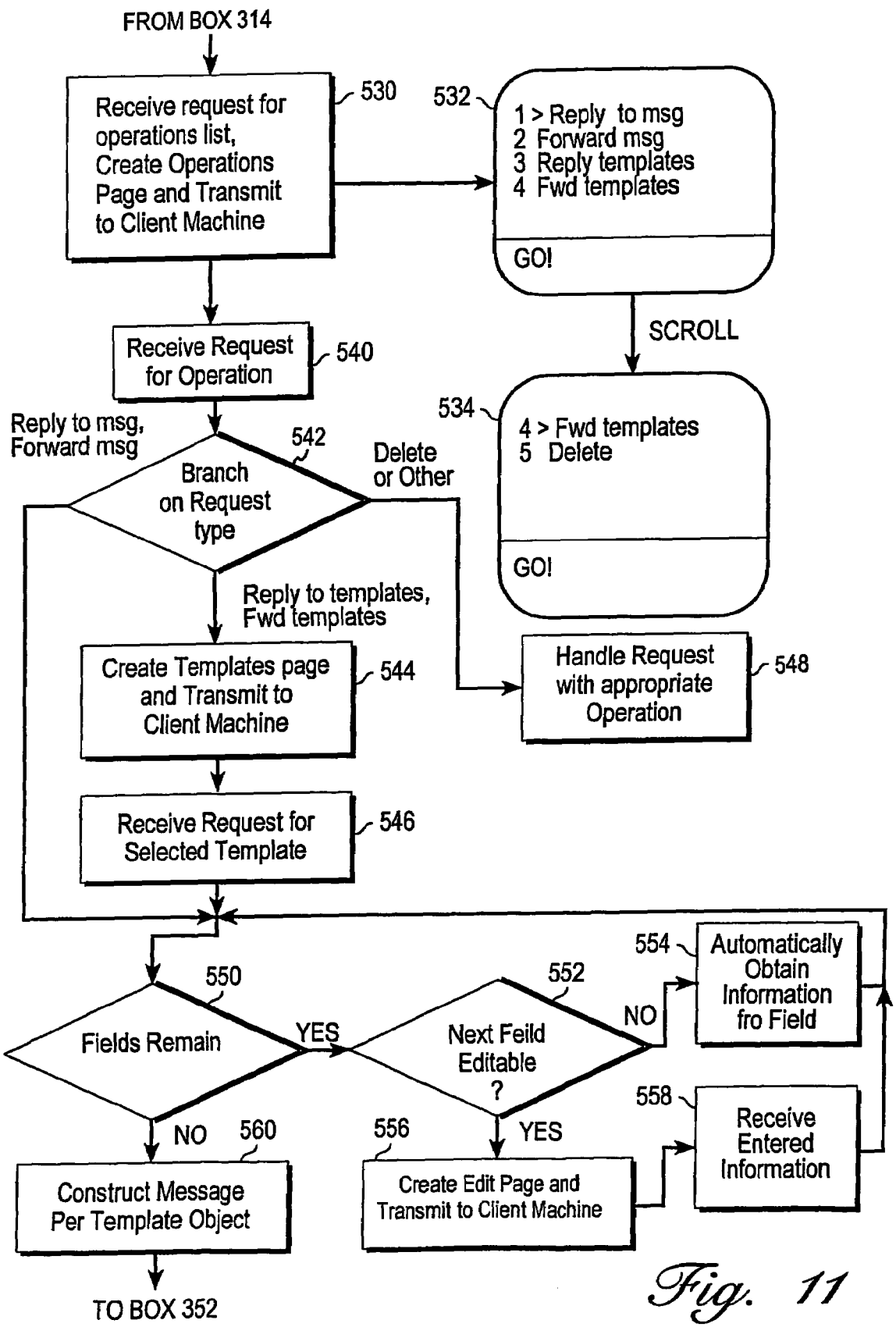
FIG. 11 is a flow chart showing operations of the IMS in responding to a request to perform a message creation operation using a template.
Figure 12:
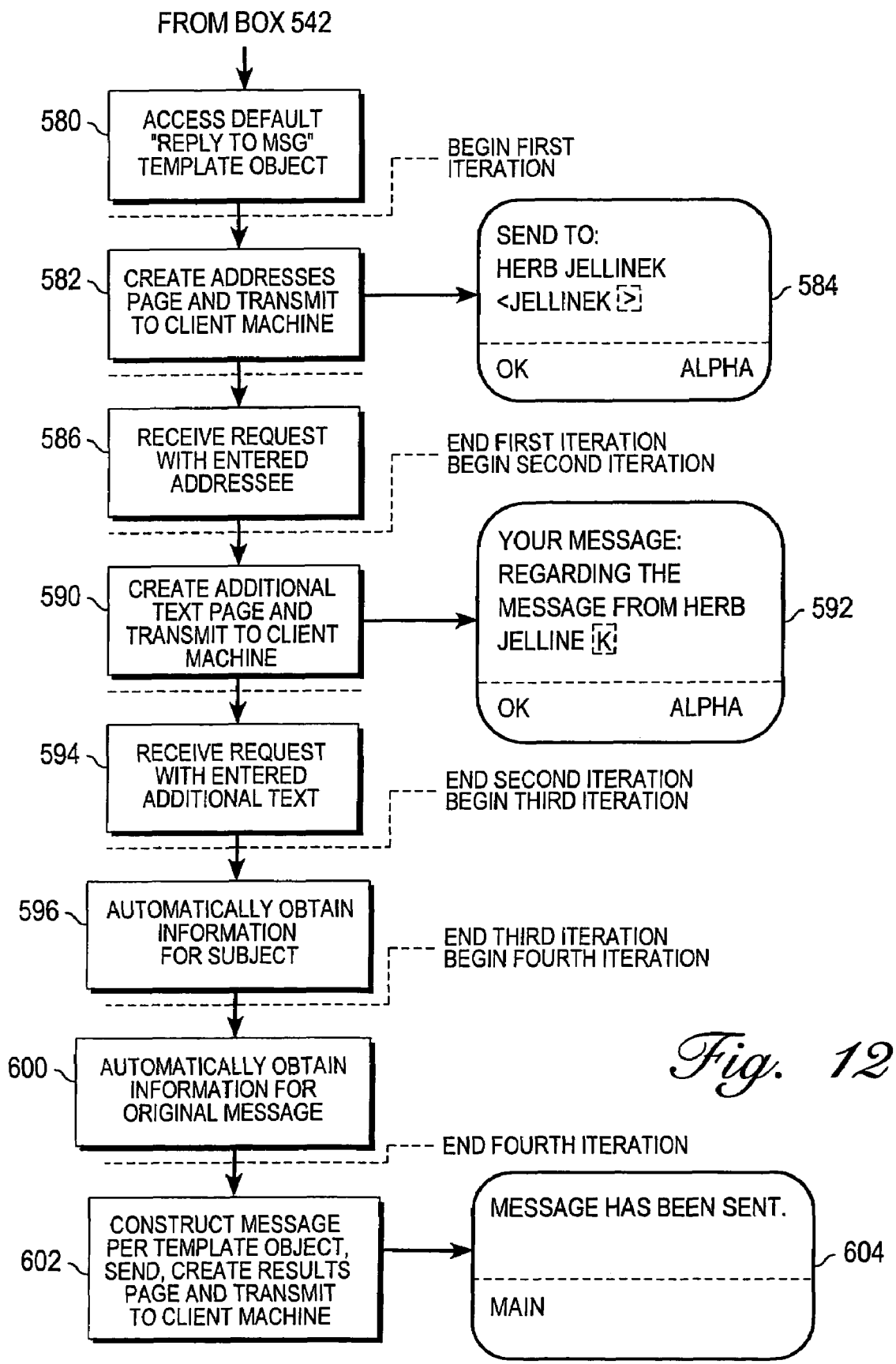
FIG. 12 is a flow chart showing how some of the acts in FIG. 11 are implemented in responding to a request for a "Reply to msg" operation.
Figure 13:
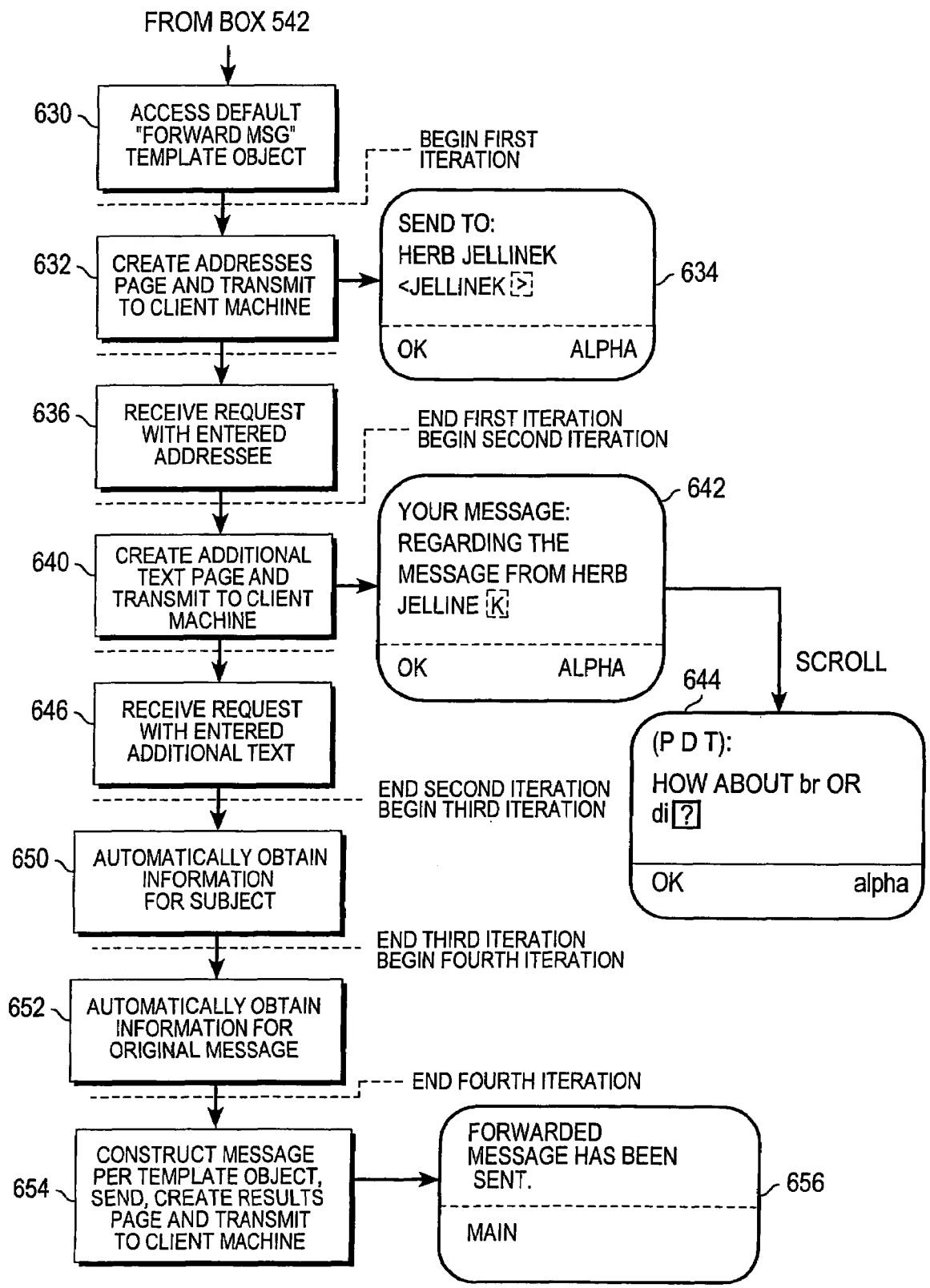
FIG. 13 is a flow chart showing how some of the acts in FIG. 11 are implemented in responding to a request for a "Forward msg" operation.
Figure 14:
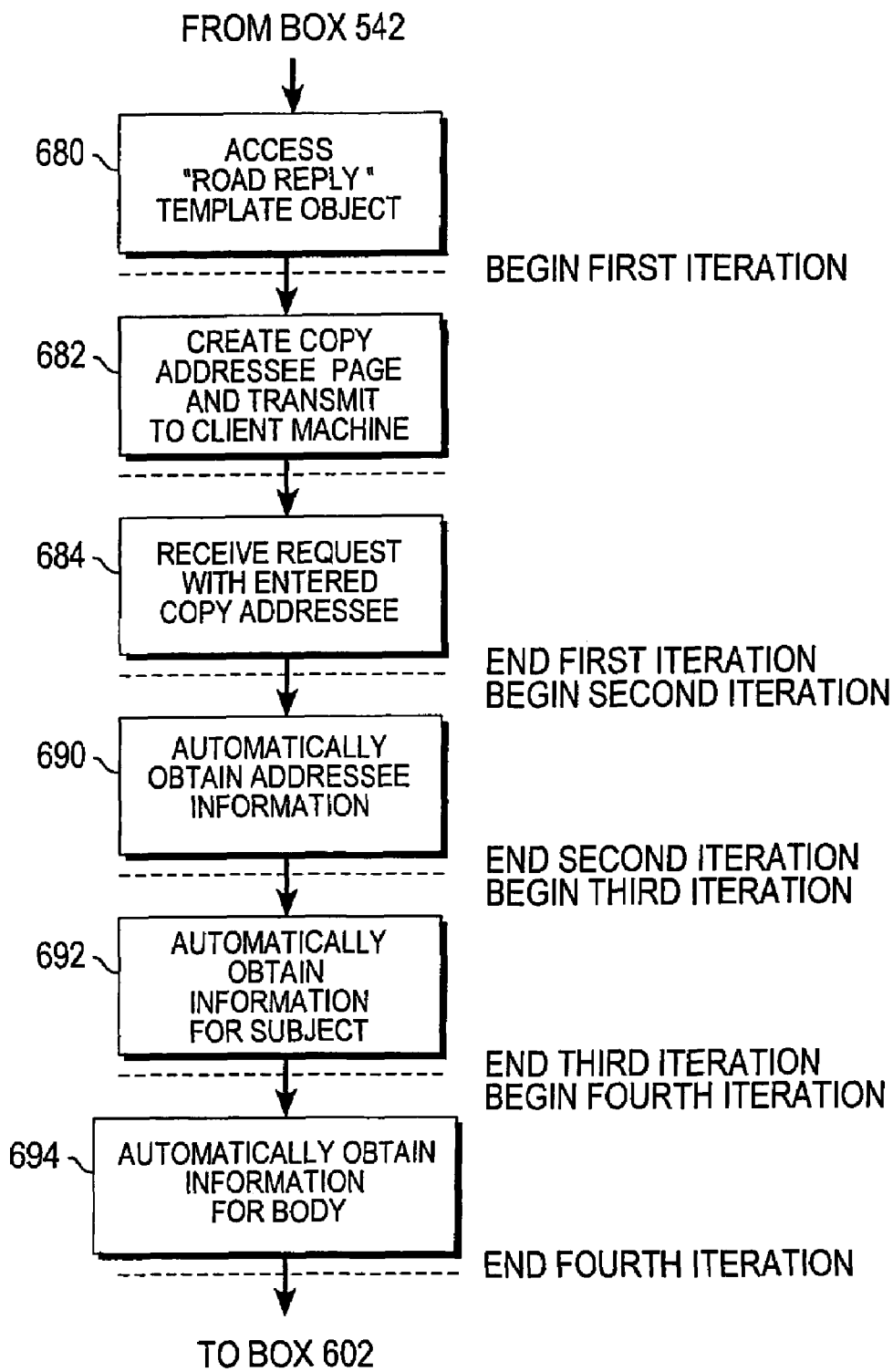
FIG. 14 is a flow chart showing how some of the acts in FIG. 11 are implemented in responding to a request to create a message using a reply template.
Figure 15:
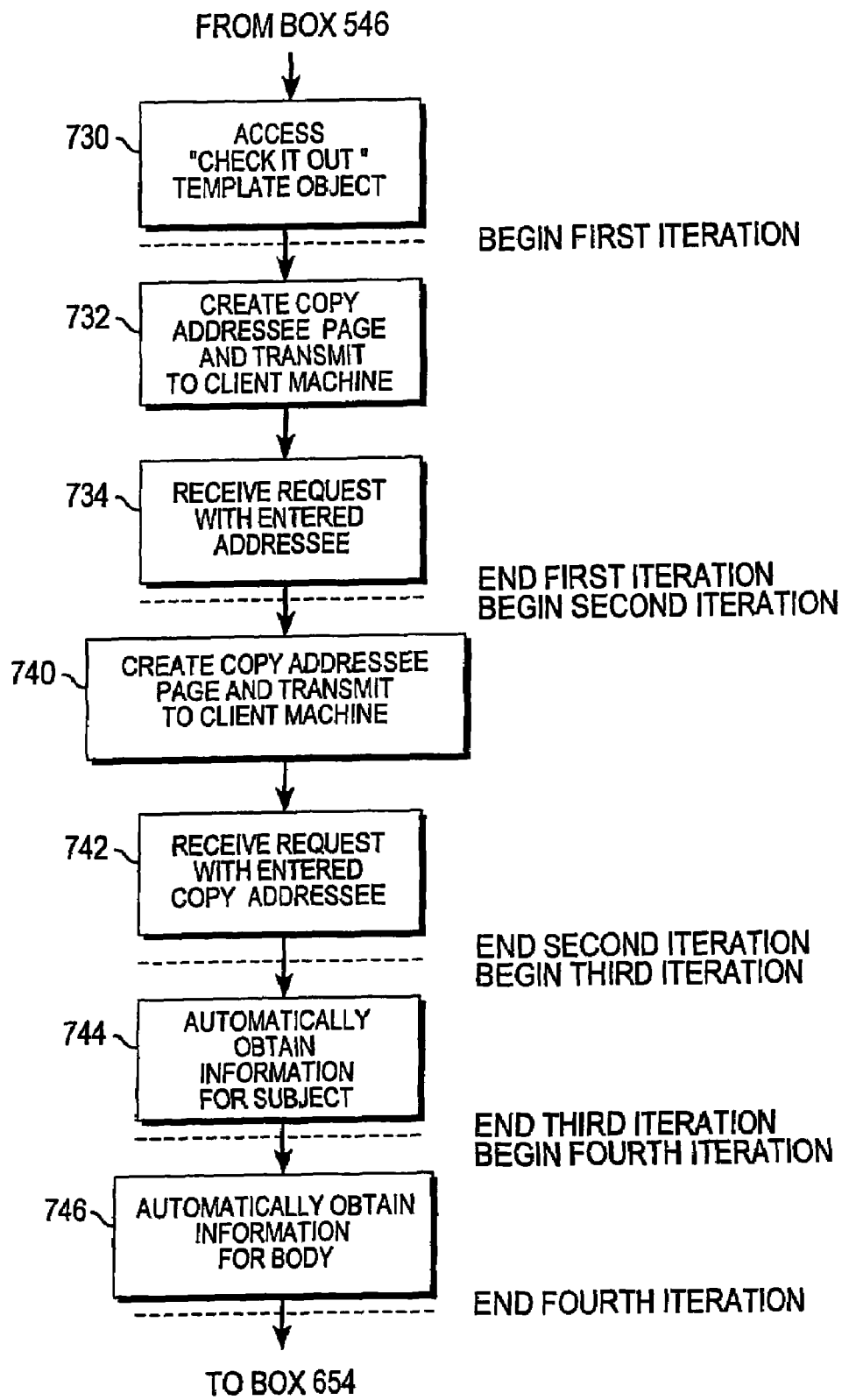
FIG. 15 is a flow chart showing how some of the acts in FIG. 11 are implemented in responding to a request to create a message using a forward template.
Figure 16:
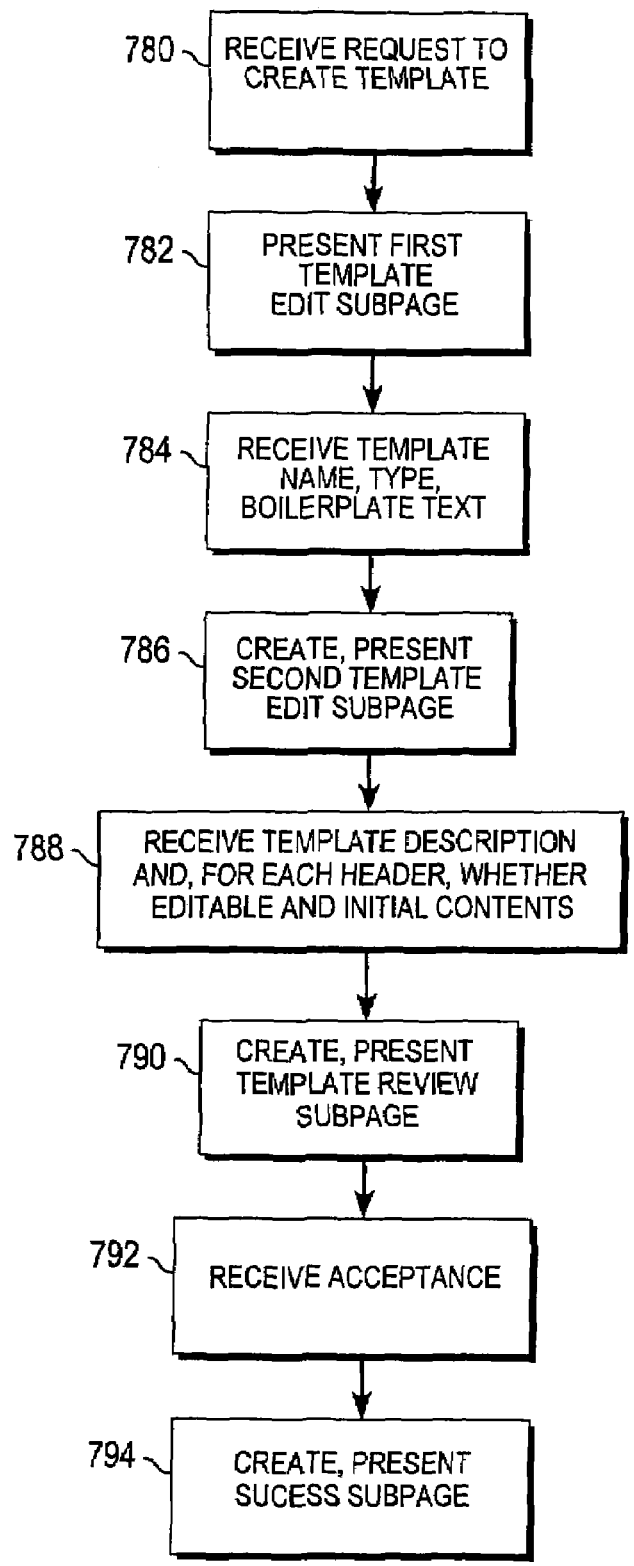
FIG. 16 is a flow chart showing how template objects could be created.

FIG. 11 illustrates how the "Read mail" operation shown in FIG. 6 and the "Send mail" operation shown in FIG. 7 can be extended to send an e-mail message using a template. FIG. 12 illustrates how the acts in FIG. 11 could be implemented if a "Reply to msg" operation is selected. FIG. 13 illustrates how the acts in FIG. 11 could be implemented if a "Forward msg" operation is selected. FIG. 14 illustrates how the acts in FIG. 11 could be implemented if a reply template is selected. FIG. 15 illustrates how the acts in FIG. 11 could be implemented if a forward template is selected. FIG. 16 illustrates creation of templates.

In FIG. 11, the act in box 530 would follow the act in box 314 in FIG. 6, if the user presses a button adjacent the "Actions" label as in display images 316 and 318, causing client machine 220 to request a list of operations relating to the currently displayed message. In box 530, the IMS receives the request for an operations list, creates an operations page, and transmits the operations page to client machine 220.

Display images 532 and 534 show first and second parts of an example of an operations page that includes a list of numbered items. Each item includes a brief description of an operation relating to the currently displayed message. In general, the IMS can always include the "Reply to msg", "Forward msg", and "Delete" operations in the operations page. But the IMS need only include the "Reply templates" operation when the user has previously created one or more reply template objects; similarly, the IMS need only include the "Fwd templates" operation when the user has previously created one or more forward template objects. Template objects can be created in the manner described below in relation to FIG. 16. Template objects created by a user can be stored in a personal directory for the user in the IMS, similar to template data 176 in FIG. 3.

As above, client machine 220 also presents a ">" symbol as a cursor to indicate the current selection within the operations page, with the first item in the list being the default current selection. When a desired operation is the current selection, the user can press a button adjacent the "Go!" label to request that the client machine 220 transmit a request to perform the selected operation to the IMS.

In box 540, the IMS receives a request for a selected operation from the operations page. The IMS branches based on the type of request, as shown in box 542.

If the request is for a "Reply templates" or "Fwd templates" operation, the IMS creates an appropriate templates page and transmits the templates page to client machine 220, in box 544. The templates page created in box 544 can be a list of template objects created by the user for replying to or forwarding messages, allowing the user to select one of the template objects and request creation of a message using the selected template object. Therefore, when the IMS receives a request to create a message using a selected template object, in box 546, it implements the general act in box 102 in FIG. 2.

In the initial implementation, the "Reply to msg" and "Forward msg" operations use default template objects, so that the act in box 540 also implements the general act in box 102 in FIG. 2 when it receives a request for one of these two operations.

If, however, the request is for a "Delete" operation or some other operation that does not use a template object, the IMS can handle the request as appropriate, as shown in box 548.

The IMS handles each operation that uses a template object by beginning an iterative loop in box 550, thus implementing the act in box 104 in FIG. 2. Each iteration of the loop handles one of the fields of the selected template object. When new message template objects are implemented, the IMS could perform the same iterative loop in response to a request to send a new message using a selected new message template object.

The IMS branches in box 552 based on whether the next field of the template object is an editable field, as indicated by an item of data that is part of the template object and that relates to the field. The act in box 552 thus implements the general act in box 110 in FIG. 2.

If the next field is not editable, the IMS automatically obtains information to complete the field, in box 554, thus implementing the general act in box 112 in FIG. 2. In other words, the technique illustrated in FIG. 11 can minimize interaction through the user interface of client machine 220 by avoiding unnecessary requests for information, only eliciting information from the user when the template object indicates it is necessary.

If, however, the field is editable, the IMS creates an edit page for the field and transmits the edit page to client machine 220, in box 556. Several examples of edit pages are described below in relation to FIGS. 12-15. The IMS then receives information entered by the user through the edit page, in box 558. The acts in boxes 556 and 558 thus implement the general act in box 114 in FIG. 2.

When all the fields of the template object have been handled, the act in box 560 constructs a message in accordance with the template object, using information from boxes 554 and 558. The message can then be sent, in much the same manner as in boxes 352 and 354 in FIG. 7.

FIG. 12 begins after box 542 in FIG. 11, in the case in which the request is for a "Reply to msg" operation. Therefore, box 580, the IMS begins by accessing the default "Reply to msg" template object, a template object in which the "To:" field and an additional text portion of the body field are editable, while the "Subject:" field and an original message portion of the body field is not editable.

A first iteration of the iterative loop beginning with box 550 in FIG. 11 handles the "To:" field. In box 582, the IMS creates an addressee page with the sender as a candidate value that can be edited by the user. The IMS then transmits the addressee page to client machine 220. The act in box 582 therefore implements the act in box 556 in FIG. 11.

Display image 584 illustrates an example of an addressee page. The user can press a button adjacent the "OK" label to cause client machine 220 to request the "To:" field be completed in accordance with an addressee value entered by the user or, if the user has made no edits, the candidate value.

In box 586, the IMS receives the request, including any addressee entered by the user, thus implementing the act in box 558 in FIG. 11 and completing the first iteration.

A second iteration of the iterative loop beginning with box 550 in FIG. 11 handles the additional text portion of the body field. In box 590, the IMS creates an additional text page in which the user can enter text. The IMS then transmits the additional text page to client machine 220. The act in box 590 therefore implements the act in box 556 in FIG. 11.

Display image 592 illustrates an example of an additional text page. As shown, the additional text page includes starting text, and the user could add additional text at the end of the starting text. The user can press a button adjacent the "OK" label to cause client machine 220 to request the additional text portion of the body field be completed with text entered by the user, if any. In the illustrated example, the user has not entered any additional text.

In box 594, the IMS receives the request, including any additional text entered by the user, thus implementing the act in box 558 in FIG. 11 and completing the second iteration.

A third iteration of the iterative loop beginning with box 550 in FIG. 11 handles the "Subject:" field. In box 596, the IMS automatically obtains information for the "Subject:" field, which is simply the subject of the original message preceded by "Re:". The act in box 596 therefore implements the act in box 554 in FIG. 11, thus completing the third iteration.

A fourth iteration of the iterative loop beginning with box 550 in FIG. 11 handles the original message portion of the body field. In box 600, the IMS automatically obtains information for the original message portion, which is simply the body of the original message and delimiters that will surround it in the message being created. The act in box 600 therefore implements the act in box 554 in FIG. 11, thus completing the fourth iteration.

The IMS could perform further iterations or other acts could be performed to obtain any other information required to construct a message, such as information about the sender and the date and time of sending. As can be seen, the user only supplies part of the necessary information, and the IMS did substantial work, thus avoiding the need to transmit the subject and the body of the original message to client machine 220 for editing.

In box 602, the IMS constructs a message in accordance with the "Reply to msg" template object, using information from boxes 586, 594, 596, and 600. The IMS then sends the message as described above in relation to box 352 in FIG. 7. The IMS also creates a results page and transmits it to client machine 220, as in box 354 in FIG. 7. Display image 604 shows an example of a results page appropriate to this context.

The message received by the addressee could appear as follows:
Message 1:
From jellinek@dua.sinia.com Wed Sep 8 13:38:29 1999
Date: Wed, 8 Sep 1999 13:38:29-0700 (PDT)
From: testuser
To: Herb Jellinek <jellinek>
Subject: Re: This is the first message in your box
Regarding the message from Herb Jellinek <jellinek> on Sun, 18 Jul 1999 13:20:13-700 (PDT):
--- Begin Included Message ---
How's it going? This is certainly a test!
love,
Herb
--- End Included Message ---

FIG. 13 also begins after box 542 in FIG. 11, in the case in which the request is for a "Forward msg" operation. Therefore, in box 630, the IMS begins by accessing the default "Forward msg" template object, a template object in which the "To:" field and an additional text portion of the body field are similarly editable, while the "Subject:" field and an original message portion of the body field is not editable.

A first iteration of the iterative loop beginning with box 550 in FIG. 11 handles the "To:" field. In box 632, the IMS creates an addressee page with the sender as a candidate value that can be edited by the user. The IMS then transmits the addressee page to client machine 220. The act in box 632 therefore implements the act in box 556 in FIG. 11.

Display image 634 illustrates an example of an addressee page. The user can press a button adjacent the "OK" label to cause client machine 220 to request the "To:" field be completed in accordance with an addressee value entered by the user or, if the user has made no edits, the candidate value.

In box 636, the IMS receives the request, including any addressee entered by the user, thus implementing the act in box 558 in FIG. 11 and completing the first iteration.

A second iteration of the iterative loop beginning with box 550 in FIG. 11 handles the additional text portion of the body field. In box 640, the IMS creates an additional text page in which the user can enter text. The IMS then transmits the additional text page to client machine 220. The act in box 640 therefore implements the act in box 556 in FIG. 11.

Display images 642 and 644 illustrate an example of an additional text page. Image 642 includes the same starting text as in image 584 in FIG. 12, but, as shown in image 644, the user has entered text that includes abbreviations. The user can press a button adjacent the "OK" label to cause client machine 220 to request the additional text portion of the body field be completed with text entered by the user, if any.

In box 646, the IMS receives the request, including any additional text entered by the user, thus implementing the act in box 558 in FIG. 11 and completing the second iteration.

A third iteration of the iterative loop beginning with box 550 in FIG. 11 handles the "Subject:" field. In box 650, the IMS automatically obtains information for the "Subject:" field, which is simply the subject of the original message preceded by "[Fwd:" and followed by "]". The act in box 650 therefore implements the act in box 554 in FIG. 11, thus completing the third iteration.

A fourth iteration of the iterative loop beginning with box 550 in FIG. 11 handles the original message portion of the body field. In box 652, the IMS automatically obtains information for the original message portion, which includes not only the body of the original message but also all its preceding headers, together with delimiters that will surround the original message in the body of the message being created. The act in box 652 therefore implements the act in box 554 in FIG. 11, thus completing the fourth iteration.

As in FIG. 12, the IMS could perform further iterations or other acts could be performed to obtain any other information required to construct a message, such as information about the sender and the date and time of sending. As above, operations of the IMS have avoided the need to transmit the subject and the body of the original message to client machine 220 for editing.

In box 654, the IMS constructs a message in accordance with the "Forward msg" template object, using information from boxes 636, 646, 650, and 652. The IMS then sends the message as described above in relation to box 352 in FIG. 7. The IMS also creates a results page and transmits it to client machine 220, as in box 354 in FIG. 7. Display image 656 shows an example of a results page appropriate to this context.

The message received by the addressee could appear as follows:

Message 2:
From jellinek@dua.sinia.com Wed Sep 8 13:42:37 1999
Date: Wed, 8 Sep 1999 13:42:37-0700 (PDT)
From: testuser
To: jellinek
Subject: [Fwd: This is the first message in your box]
Regarding the message from Herb Jellinek <jellinek> on Sun, 18 Jul 1999 13:20:13-700 (PDT):
How about breakfast or dinner?
--- Begin Included Message ---
Received: (from jellinek@localhost)
By dua. (8.9.1b+Sun/8.9.1) id NAA04469
For testuser; Sun, 18 Jul 1999 13:20:13-0700 (PDT)
Date: Sun, 18 Jul 1999 13:20:13-0700 (PDT)
From: Herb Jellinek <jellinek>
Message-Id: <199907182020.NAA04469@dua.>
To: testuser
Subject: This is the first message in your box
Content-Length: 58
How's it going? This is certainly a test!
love,
Herb
--- End Included Message ---

FIG. 14 begins after box 546 in FIG. 11, in the case in which the request is for creation of a message using a reply template illustratively named "RoadReply". The purpose of the RoadReply template is to provide a quick reply to a message's sender while the user is traveling.

In box 680, the IMS begins by accessing the "RoadReply" template object, a template object in which the "Cc:" field is editable, while the "To:" field, the "Subject:" field, and the body field are not editable.

A first iteration of the iterative loop beginning with box 550 in FIG. 11 handles the "Cc:" field. In box 682, the IMS creates a copy addressee page with the user as a candidate value that can be edited. The IMS then transmits the copy addressee page to client machine 220. The act in box 682 therefore implements the act in box 556 in FIG. 11. The copy addressee page can resemble the addressee pages shown in images 584 and 634, described above. As described there, the user can press a button adjacent the "OK" label to cause client machine 220 to request the "Cc:" field be completed in accordance with a copy addressee value entered by the user or, if the user has made no edits, the candidate value.

In box 684, the IMS receives the request, including any copy addressee entered by the user, thus implementing the act in box 558 in FIG. 11 and completing the first iteration.

A second iteration of the iterative loop beginning with box 550 in FIG. 11 handles the "To:" field. In box 690, the IMS automatically obtains addressee information for the "To:" field, which is the e-mail address from the "Sender" field of the original message. The act in box 690 therefore implements the act in box 554 in FIG. 11, thus completing the second iteration.

A third iteration of the iterative loop beginning with box 550 in FIG. 11 handles the "Subject:" field. In box 692, the IMS automatically obtains information for the "Subject:" field, which is simply the subject of the original message preceded by "Re:". The act in box 692 therefore implements the act in box 554 in FIG. 11, thus completing the third iteration.

A fourth iteration of the iterative loop beginning with box 550 in FIG. 11 handles the body field. In box 694, the IMS automatically obtains information for the body field, which is simply the body of the original message, preceded and followed by delimiters that will surround it in the message being created, and, before the preceding delimiter, a boilerplate text that is inserted automatically in all messages created in accordance with the RoadReply template. An appropriate boilerplate text might be:

"Hi,
"I'm traveling right now and can't send you a detailed reply, but I have read your message and will send a full reply tonight, if not sooner.
"Regards,
"Herb"

The act in box 694 therefore implements the act in box 554 in FIG. 11, thus completing the fourth iteration.

Then the IMS can continue as in box 602 in FIG. 12, constructing a message in accordance with the "RoadReply" template object, using information from boxes 684, 690, 692, and 694. The IMS can also create a results page similar to display image 604 in FIG. 12 and can transmit it to client machine 220.

FIG. 15 also begins after box 546 in FIG. 11, in the case in which the request is for creation of a message using a forward template illustratively named "CheckItOut". The purpose of the CheckItOut template is to quickly forward a message to a recipient who may be interested in it.

In box 730, the IMS begins by accessing the "CheckItOut" template object, a template object in which the "To:" field and the "Cc:" field are editable, while the "Subject:" field and the body field are not editable.

A first iteration of the iterative loop beginning with box 550 in FIG. 11 handles the "To:" field. In box 732, the IMS creates an addressee page. The IMS then transmits the addressee page to client machine 220. The act in box 732 therefore implements the act in box 556 in FIG. 11. The addressee page can resemble the addressee pages shown in images 584 and 634, described above, but without a candidate value. As described there, the user can press a button adjacent the "OK" label to cause client machine 220 to request the "To:" field be completed in accordance with an addressee value entered by the user.

In box 734, the IMS receives the request, including the addressee entered by the user, thus implementing the act in box 558 in FIG. 11 and completing the first iteration.

A second iteration of the iterative loop beginning with box 550 in FIG. 11 handles the "Cc:" field. In box 740, the IMS creates a copy addressee page with the user as a candidate value that can be edited. The IMS then transmits the copy addressee page to client machine 220. The act in box 740 therefore implements the act in box 556 in FIG. 11. The copy addressee page can resemble the copy addressee page described above in relation to box 682 in FIG. 13. As described there, the user can press a button adjacent the "OK" label to cause client machine 220 to request the "Cc:" field be completed in accordance with a copy addressee value entered by the user or, if the user has made no edits, the candidate value.

In box 742, the IMS receives the request, including any copy addressee entered by the user, thus implementing the act in box 558 in FIG. 11 and completing the second iteration.

A third iteration of the iterative loop beginning with box 550 in FIG. 11 handles the "Subject:" field. In box 744, the IMS automatically obtains information for the "Subject:" field, which is simply the subject of the original message preceded by "[Fwd:" and followed by "]". The act in box 744 therefore implements the act in box 554 in FIG. 11, thus completing the third iteration.

A fourth iteration of the iterative loop beginning with box 550 in FIG. 11 handles the body field. In box 746, the IMS automatically obtains information for the body field, which is simply the headers and body of the original message, preceded and followed by delimiters that will surround it in the message being created, and, before the preceding delimiter, a boilerplate text that is inserted automatically in all messages created in accordance with the CheckItOut template. An appropriate boilerplate text might be:

"Hi—I thought this would be of interest to you. Let me know what you think.

"Herb"

The act in box 746 therefore implements the act in box 554 in FIG. 11, thus completing the fourth iteration.

Then the IMS can continue as in box 654 in FIG. 13, constructing a message in accordance with the "CheckItOut" template object, using information from boxes 734, 742, 744, and 746. The IMS can also create a results page similar to display image 656 in FIG. 13 and can transmit it to client machine 220.

CREATING TEMPLATES

As pointed out above, FIGS. 11-15 illustrate how the acts in boxes 102, 104, 110, 112, and 114 in FIG. 2 could be implemented. The act in box 100 in FIG. 2, in which a template is produced in response to signals from a first user interface, could also be implemented in many ways with a wide variety of user interface techniques, preferably on a machine with a full size screen and keyboard to allow easy interaction.

According to one embodiment, a template object can include a series of data fields. First can be a data field for the template's name. Next can be a data field for the short description of the template. Next can be a series of data fields, one for each potentially editable message header; each of these fields can include a subfield with its initial contents, if any, and another subfield indicating whether the header can be edited. Next can be a data field for boilerplate text, if any. If the user interface permits, this could be followed with a data field for free text or additional text entered by the user. Next can be a data field indicating whether a message created using the template should include an original message. Finally, the template object can include a data field that indicates its type.

FIG. 16 illustrates one embodiment of the act in box 100, using a personal web page that the user can access with a personal computer or workstation using conventional web browser software. By setting preferences and providing information through the personal web page, the user can cause the IMS to create a template object.

In FIG. 16, the IMS begins by receiving a request to create a template, in box 780. The user can make this request, for example, by selecting a link in the personal web page.

In response to the request in box 780, the IMS presents a first template edit subpage, in box 782. The first template edit subpage in the initial implementation includes a field in which the user can enter:

a name for the template;

alternative fields allowing the user to select the type of the template; and a field into which the user can enter boilerplate text, or which the user can leave blank if no boilerplate text is desired.

The name of the template can be elicited with a question, such as "What would you like to call this template?". The choice of the type of template can similarly be elicited with a question, such as "What will you use this template for?", with the choices including "Creating new messages", "Replying to messages", and "Forwarding messages". The boilerplate field can be introduced with an instruction, such as "Enter any text that should be included in all messages you compose with this template ('Boilerplate' text). You will not see this text on your mobile device, but it will be included in messages. (Leave blank if you don't wish to include any.)"

The first template edit subpage can also include a link the user can select to provide entered information to the IMS and to request presentation of a second template edit subpage. When the user selects the link, the IMS receives the template's name (e.g. TemplateName), type, and boilerplate text, in box 784. According to one embodiment, the "type" of a template indicates the service to which the template corresponds. For example, the type of a template may indicate that the template is for use with the "forward email" service, a "create new email" service, or a "create new calendar event" service. When the IMS receives the type information for a new template, the IMS uses the type information to establish a mapping between services and templates. Thus, when a particular service is requested and the user requests the use of a template, the IMS is able to determine which templates to include in the template list presented to the user.

In addition, the type of a template may be used to determine the form, format or content of the template edit subpages presented to the user during the template creation process. For example, the system may present one format of template edit subpages to a user that is creating an email-related template, and a different format of template edit subpages to a user that is creating a calendar-event-related template.

In box 786, the IMS creates and presents the second template edit subpage, based at least in part on information received in box 784. The second template edit subpage in the initial implementation includes a field in which the user can enter a short description of the template and, for each potentially editable header of the template, i.e. "To:", "Cc:", and "Subject:", a checkbox that can be selected to indicate that the header can be edited and a field in which the user can enter initial contents of the header. The short description can be elicited with an instruction, such as "Please enter a short description". Completion of the checkboxes and fields for the editable headers can be elicited with an instruction, such as "Select the header lines you wish to be able to edit when using the "TemplateName" template. Those that are not selected will be requested automatically or filled-in automatically, as appropriate." If the template type is forward, the "Subject:" header can have a non-selectable checkbox and its initial contents field can be replaced with the words "(supplied automatically)".

The second template edit subpage can also include a link the user can select to provide entered information to the IMS and to request presentation of a template review subpage. When the user selects the link, the IMS receives the template's short description and, for each potentially editable field, information on whether the field is editable and, if so, its initial contents, in box 788. Then, in box 790, the IMS creates and presents a template review page, based on the information received in boxes 784 and 788.

The template review page in the initial implementation summarizes all the information about the template, and can include an introduction such as "Here is the 'TemplateName' template you just created. If you like what you see, click the 'Finished' button. Otherwise press the browser's 'Back' button to go back and make changes, or click 'Cancel' to discontinue work." The first line can be followed by a table with several lines. On a first line, the table can include the template's name, followed by its short description in parentheses, followed in turn by a brief description of how the template will be used, e.g. reply to messages, forward messages, or create new messages. On a second line, it can include the template's boilerplate text, after an introduction such as "Template includes boilerplate:". On a third line, it can include an introduction such as "You will be able to edit the", followed by checkboxes which indicate, for each type of header, whether the header is editable. And, where appropriate, it can include a fourth line with a sentence indicating that the IMS will include the original message. The template review page can also include "Finished" and "Cancel" links as mentioned in the introduction.

When the user clicks on the "Finished" button, the IMS receives a signal indicating acceptance of the template, in box 792, and takes appropriate steps to store a template object with all the information about the template. Then the IMS can create and present a success subpage, confirming to the user that the user has successfully edited and saved the template in his or her preferences in the IMS. The success subpage can also include a link the user can select to view a list of all templates.

The list of all templates can also enable the user to take other actions for a template, such as editing, renaming, or deleting the template.

USING THE WEB TO AFFECT IMS OPERATION

The implementation shown in FIG. 16 is just one example of how the personal web page can be used. More generally, it can be used to set preferences and activity logs and to provide information relating to the user's personal information, e-mail, calendar, and directory. It can also be used to provide help in using the IMS. For example, in relation to e-mail, the user could set various preferences, such as how messages are described in a message list page created in box 310 in FIG. 6, using a message's "From" header rather than its "Subject" header, or how messages are presented in a formatted message page created in box 314 in FIG. 6, such as "Show first 25 words only" for a message's body. Also in relation to e-mail, the user could list frequently used remote printers, fax numbers, and copy shops to which attachments may be forwarded for rendering.

In relation to any server action that can receive text from client machine 220, the user could enter abbreviations and the expanded forms the IMS will use for them. In relation to server actions, generally, the user could enter alternative server-based services, such as alternative address books or calendars or other shared services, or information services to be delivered to client machine 220 by the IMS, such as news updates or other Internet or intranet-based content to be periodically delivered. The IMS can also use the personal web page to present logs of various activities it has automatically created, such as logs of billable transactions, including remote facsimile delivery of documents or other services billed on a pay-per-use basis; instant messaging logs showing full transcripts of chat sessions; e-mail activity logs showing messages received and sent via the IMS; logs of wireless transmission time used for IMS services; and so forth.

A similar user interface could allow a corporate systems administrator or equivalent to configure global settings that define various aspects of the communication protocol for any user accessing the specific network through the IMS. Examples of global settings include settings relating to security (including types of messages that may not be transmitted through the IMS, defined by a list of restricted senders, keyword inclusion in any header, or specified sender domain name), definition of internal mail addresses, directory structure and location, user and password maintenance, settings for IMS interaction with corporate e-mail and calendar programs.

VARIATIONS

The techniques described above in relation to FIGS. 11-16 have been successfully implemented. The implementation allows a user to create templates for message creation through a personal web page and to then request message creation using the templates through a mobile phone user interface.

The implementations described above could be varied in many ways within the scope of the invention. For example, an implementation similar to the above description has been successfully executed on server machines with several operating system/CPU architecture combinations, including Microsoft Windows NT 4.0/Intel x86, Sun Solaris 7/Intel x86, Sun Solaris 7/Sun UltraSPARC, and by running atop an Apache 1.3 Web server, but implementations could be executed on any other appropriate server machines, and the services described could be provided by one or more computers.

An implementation similar to the above description has been successfully executed by running a custom set of servlets compiled from Java programming language source code, but implementations could run code of any other appropriate type and compiled from any other appropriate source, such as from other programming languages and environments, including non-object-oriented environments.

An implementation similar to the above description has been successfully executed with client machines that are wireless telephones such as Motorola P7389 or a Nokia 7110 telephones, each executing Phone.com's UP Browser 3.1 or UP Browser 4.0. Experiments have also shown that a client machine could be a Palm Pilot V or other PDA, by successfully downloading AUSystem's WAP browser to a Palm Pilot V, connecting to a server, logging in, and sending e-mail. Implementations could, however, use any other appropriate client machine executing any other Wireless Markup Language (WML) browser or other software by which information can be presented to a user. For example, client machines could include remote or mobile devices such as cellular telephones, pagers, landline display screen telephones, set-top boxes, general purpose computers, and so forth.

An implementation similar to the above description has been successfully executed using the Internet to provide a communication network and using the WAP protocols, including WML 1.0 and WML 1.1, to present information to and receive information from client machines, but various other communication networks and protocols could be used. For example, instead of the Internet, a private intranet such as leased lines could provide a communication network between provider's network and carrier's network on the one hand and between provider's network and user's network on the other. Or a virtual private network (VPN) could be used as mentioned above, with secure encryption and decryption to create a sort of subnetwork on the Internet.

The implementations described above permit a user to access information stored by the user in a server on the user's network, but a user could access information stored by others and could also access information stored on other networks, whether in a corporate or personal server.

The implementations described above provide a user interface with a specific set of top-level operations implemented in specific ways and with various other operations available in response to selections made by pushing buttons adjacent labels, but various other user interfaces could be provided, with or without top-level operations, with various other sets of top-level operations and other available operations, with the same or similar operations but implemented differently, with different labels adjacent push buttons, or with selection techniques other than pushing buttons.

In the implementations described above, a server machine has a specific kind of first user interface, a personal web page, for interactively producing templates in a specific way and a specific kind of second user interface for obtaining information in a specific way for performing server actions using templates, but web pages could be used to interactively produce templates in various other ways, information for performing server actions could be obtained in various other ways, and the server machine could have any other appropriate kind of user interface for interactively producing templates or for obtaining information for performing server actions.

In the implementations described above, a template is embodied in a template object with specific data fields with specific types of data. Templates could take various other forms, however, with other fields and with other types of data. Specifically, the template objects described above include a subfield for indicating whether a message header is editable, but a attribute data indicating whether it is necessary to obtain information to complete a template field could be obtained in various other ways. Furthermore, templates could include various other types of fields allowing various other features, such as automatic inclusion of attachments or other information, editing or augmentation of a message's body or of any other part of a message, and so forth.

In the examples described above, templates are used to reply to a message or to forward a message, but templates could also be used to create new messages, such as by modifying the acts in FIG. 7 to allow for message creation from a template whenever a user requests to send a new message, and templates could also be used for various server actions other than message creation, including creation of appointments (which could also result automatically sending e-mail messages created from templates, such as at the time an appointment is created or modified or at the time of the appointment) and creation of database or enterprise resource planning (ERP) queries (which could include converting a query into a series of commands or queries to a corporate server that would interpret results and display them).

In the examples described above, the request to perform a server action using a template results from user action and each illustrated template includes at least one editable field. The invention could, however, be implemented so that requests to perform a server action using a template can be automatically generated when appropriate, and templates can include no fields for which it is necessary to obtain information from a user, so that server action using templates could occur with minimum user interaction, perhaps only a single choice of whether to perform the server action. For example, a new message template could have a fixed addressee, subject, and body, for use in a frequently occurring situation, such as when one is running late. Or a reply template could have a fixed boilerplate portion of the body and automatically completed subject and original message portion of the body, and could be sent back to the sender of a message in a frequently occurring situation, such as to acknowledge receipt of the message. Or a forward template could have a fixed addressee and boilerplate portion of the body, and automatically completed subject and original message portion of the body, and could be sent to the fixed addressee in a frequently occurring situation, such as to share a message of mutual interest.

In the implementations described above, acts are performed in an order that could in many cases be modified. Also, in the implementation described above, certain software components are mentioned, but the invention could be implemented with other combinations of hardware and software and with software organized in any appropriate way.

The invention has been applied in a context in which e-mail messages presented on wireless telephones can be replied to or forwarded using templates, but the invention could be applied in various other contexts. Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

HARDWARE OVERVIEW

Figure 17:
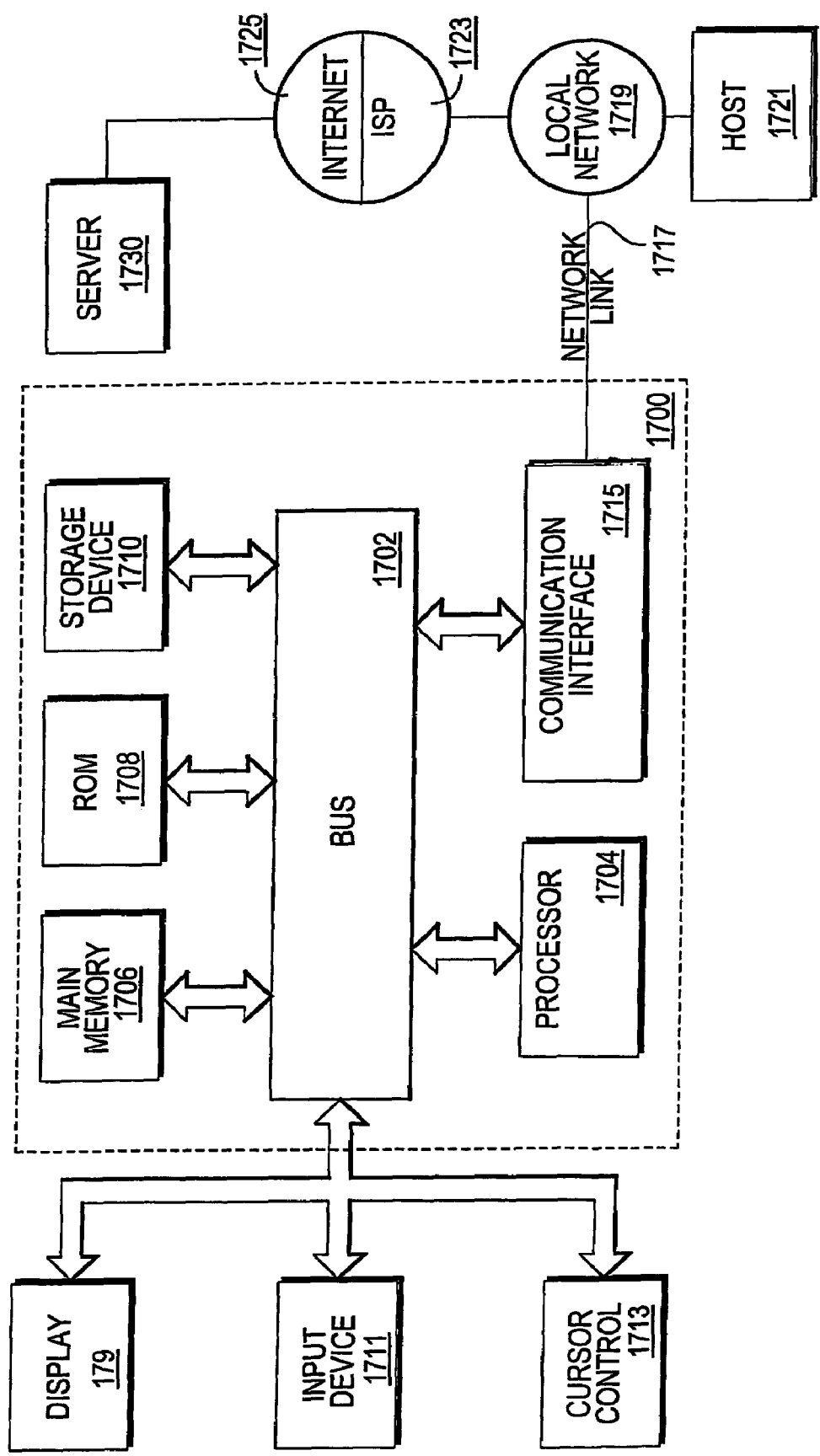
FIG. 17 is a block diagram of a computer system that may be used to implement embodiments of the invention.

FIG. 17 is a block diagram that illustrates a computer system 1700 upon which an embodiment of the invention may be implemented. Computer system 1700 includes a bus 1702 or other communication mechanism for communicating information, and a processor 1704 coupled with bus 1702 for processing information. Computer system 1700 also includes a main memory 1706, such as a random access memory (RAM) or other dynamic storage device, coupled to bus 1702 for storing information and instructions to be executed by processor 1704. Main memory 1706 also may be used for storing temporary variables or other intermediate information during execution of instructions to be executed by processor 1704. Computer system 1700 further includes a read only memory (ROM) 1708 or other static storage device coupled to bus 1702 for storing static information and instructions for processor 1704. A storage device 1710, such as a magnetic disk or optical disk, is provided and coupled to bus 1702 for storing information and instructions.

Computer system 1700 may be coupled via bus 1702 to a display 179, such as a cathode ray tube (CRT), for displaying information to a computer user. An input device 1711, including alphanumeric and other keys, is coupled to bus 1702 for communicating information and command selections to processor 1704. Another type of user input device is cursor control 1713, such as a mouse, a trackball, or cursor direction keys for communicating direction information and command selections to processor 1704 and for controlling cursor movement on display 179. This input device typically has two degrees of freedom in two axes, a first axis (e.g., x) and a second axis (e.g., y), that allows the device to specify positions in a plane.

The invention is related to the use of computer system 1700 for implementing the techniques described herein. According to one embodiment of the invention, those techniques are performed by computer system 1700 in response to processor 1704 executing one or more sequences of one or more instructions contained in main memory 1706. Such instructions may be read into main memory 1706 from another computer-readable medium, such as storage device 1710. Execution of the sequences of instructions contained in main memory 1706 causes processor 1704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1704 for execution. Such a medium may take many forms, including but not limited to, non-volatile media, volatile media, and transmission media. Non-volatile media includes, for example, optical or magnetic disks, such as storage device 1710. Volatile media includes dynamic memory, such as main memory 1706. Transmission media includes coaxial cables, copper wire and fiber optics, including the wires that comprise bus 1702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1704 for execution. For example, the instructions may initially be carried on a magnetic disk of a remote computer. The remote computer can load the instructions into its dynamic memory and send the instructions over a telephone line using a modem. A modem local to computer system 1700 can receive the data on the telephone line and use an infra-red transmitter to convert the data to an infra-red signal. An infra-red detector can receive the data carried in the infra-red signal and appropriate circuitry can place the data on bus 1702. Bus 1702 carries the data to main memory 1706, from which processor 1704 retrieves and executes the instructions. The instructions received by main memory 1706 may optionally be stored on storage device 1710 either before or after execution by processor 1704.

Computer system 1700 also includes a communication interface 1715 coupled to bus 1702. Communication interface 1715 provides a two-way data communication coupling to a network link 1717 that is connected to a local network 1719. For example, communication interface 1715 may be an integrated services digital network (ISDN) card or a modem to provide a data communication connection to a corresponding type of telephone line. As another example, communication interface 1715 may be a local area network (LAN) card to provide a data communication connection to a compatible LAN. Wireless links may also be implemented. In any such implementation, communication interface 1715 sends and receives electrical, electromagnetic or optical signals that carry digital data streams representing various types of information.

Network link 1717 typically provides data communication through one or more networks to other data devices. For example, network link 1717 may provide a connection through local network 1719 to a host computer 1721 or to data equipment operated by an Internet Service Provider (ISP) 1723. ISP 1723 in turn provides data communication services through the world wide packet data communication network now commonly referred to as the "Internet" 1725. Local network 1719 and Internet 1725 both use electrical, electromagnetic or optical signals that carry digital data streams. The signals through the various networks and the signals on network link 1717 and through communication interface 1715, which carry the digital data to and from computer system 1700, are exemplary forms of carrier waves transporting the information.

Computer system 1700 can send messages and receive data, including program code, through the network(s), network link 1717 and communication interface 1715. In the Internet example, a server 1727 might transmit a requested code for an application program through Internet 1725, ISP 1723, local network 1719 and communication interface 1715.

The received code may be executed by processor 1704 as it is received, and/or stored in storage device 1710, or other non-volatile storage for later execution. In this manner, computer system 1700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of operating a server machine to perform server actions, the method comprising:
   storing, at said server machine, a template having predefined user data for use in performing server actions, wherein the template includes
   a plurality of fields,
   attribute data associated with each of the fields, and
   previously entered user data associated with at least one field of said plurality,
   wherein the attribute data indicates whether it is necessary to obtain information to complete a corresponding field from users of the template;
   receiving a request from a client machine for performance of a server action using the template; and
   in response to the request, performing a server action using the template wherein the step of performing the server action includes, for each of the fields of said plurality:
   determining from the attribute data whether it is necessary to obtain information to complete the field;
   if it is not necessary to obtain information to complete the field, then performing the server action without obtaining information from the client machine to complete the field, said performing the server action without obtaining information from the client machine includes, for the at least one field, using the previously entered user data to complete the at least one field; and if it is necessary to obtain information to complete the field, then obtaining information from the client machine to complete the field prior to performing the server action.

2. The method of claim 1 further comprising the step of, prior to storing the template, producing the template based on user input received from a second client machine that is different from said client machine.

3. The method of claim 2 wherein
the step of producing the template includes:
receiving user input that indicates that said field is editable, and
receiving user input that specifies a candidate value for said field; and
the step of obtaining information from the client machine includes:
transmitting the candidate value to said client machine; and
receiving a signal from said client machine that indicates that said candidate value is to be used for said field during said server action.

4. The method of claim 2 wherein the second client machine includes a display and keyboard that are not part of the client machine.

5. The method of claim 4 in which the display and keyboard are part of a workstation or personal computer that communicates with the server machine through a network.

6. The method of claim 5 in which the network is an Internet.

7. The method of claim 1 in which the client machine is machine from a set that consists of a portable telephone and a personal digital assistant.

8. The method of claim 1 in which the server action is creation of a message.

9. The method of claim 8 in which one of the plurality of fields is an address field.

10. The method of claim 9 wherein:
the address field is a to-address field;
the template further includes a message type item of data indicating whether the message is a reply to an existing message;
the method further comprises, performing the following steps if it is not necessary to obtain information to complete the to-address field:
determining from the message type item of data whether the message is a reply; and
if the message is a reply, then automatically extracting an address from the existing message to complete the to-address field.

11. The method of claim 10 wherein:
the at least one field includes the to-address field;
the previously entered user data includes an address item of data indicating an address; and
the method further comprises the step of using the address item of data to complete the to-address field if the message is not a reply.

12. The method of claim 8 in which one of the plurality of fields is a subject field.

13. The method of claim 12 wherein:
the template further includes a message type item of data indicating whether the message is derived from an existing message;
the method further includes performing the following steps if it is not necessary to obtain information to complete the subject field:
determining from the message type item of data whether the message is derived from an existing message; and
if the message is derived from an existing message, automatically extracting a subject from the existing message to complete the subject field.

14. The method of claim 13 wherein:
the at least one field includes the subject field;
the previously entered user data includes a subject item of data indicating a subject;
the method further comprises the step of using the subject item of data to complete the subject field if the message is not derived from an existing message.

15. The method of claim 8 wherein:
the at least one field includes a body field;
the previously entered user data includes a body item of data indicating a message body; and
the method further comprises the step of using the body item of data to complete the body field if it is not necessary to obtain information to complete the field.

16. The method of claim 1 in which the server action is scheduling an appointment.

17. The method of claim 1 in which the server action is submission of a database query.

18. The method of claim 1 in which the attribute data includes a flag bit indicating whether it is necessary to obtain information t6 complete the field.

19. A method of performing server actions that require user input, the method comprising the steps of:
storing, at a server machine, a plurality of user-defined templates associated with a plurality of server actions that the server machine can perform, each of said templates includes a plurality of fields previously indicated to be editable or non-editable by a user defining said template, attribute data associated with each of the fields, and previously entered user data associated with at least one field of said plurality of fields;
receiving, from a client machine, a request to perform a particular server action of said plurality of server actions;
determining, from said plurality of templates, a set of templates that are associated with said particular server action;
transmitting to said client machine information that allows a user of said client machine to select a particular template in said set of templates;
receiving, from the client machine, a signal that selects said particular template;
providing at least one edit page from said server machine to said client machine for each field indicated to be editable by said user defining said template; and
performing said particular server action using previously entered user data from said particular template as at least a portion of the user input required for said particular server action.

20. A computer-readable storage medium storing instructions for performing server actions, the instructions including instructions for performing the steps of: receiving first user input for a template, said template is at least one of a message generation template, an appointment scheduling template, and a database query submission template; storing said template at a server machine, said template includes previously entered user data to serve as input data for one or more fields requiring input for performance of a server action; after said template has been stored, receiving from a client machine a request to perform a server action that requires user input for a plurality of fields; receiving a signal from said client machine that indicates whether to use said template to perform said server action; if said signal indicates to use said template to perform said server action, then performing said server action using said previously entered user data as user input for one or more of said plurality of fields; if said signal indicates to not use any template to perform said server action, then performing the steps of: requesting user input for said plurality of fields from said client machine; and performing said server action using user input received from said client machine for said plurality of fields.

21. The computer-readable storage medium of claim 20 wherein: the step of receiving first user input includes receiving a candidate value for a first field of said plurality of fields, said previously entered user data includes said candidate value; the computer-readable storage medium further includes instructions for performing the following steps when said signal indicates to use said template to perform said server action: transmitting to said client machine said candidate value; and causing said client machine to provide to a user of said client machine an option of selecting said candidate value as the user input to use for said first field during performance of said server action.

22. The computer-readable storage medium of claim 20 wherein the step of performing said server action using said previously entered user data as user input for one or more of said plurality of fields includes performing said server action using a portion of said previously entered user data as user input for one of said plurality of fields without transmitting said portion of said previously entered user data to said client machine.

23. The computer-readable storage medium of claim 20 wherein: the step of receiving first user input for the template includes receiving user input that designates, for each of said plurality of fields, whether the field is editable; and the step of performing said server action using said previously entered user data as user input for one or more of said plurality of fields includes using said previously entered user data for the fields of said plurality of fields that are not designated editable; and sending to said client machine requests for user input for the fields of said plurality of fields that are designated editable.

24. A method of performing server actions, comprising:
receiving first user input to create a user-defined template including a first plurality of fields and pre-defined data for at least one of said first plurality of fields, said first user input indicates whether each of said first plurality of fields is an editable field or a non-editable field;
storing said template at a server machine;
receiving a request from a client machine to perform a first server action using said template, said first server action requires user input for a second plurality of fields corresponding to said first plurality of fields of said template;
providing at least one edit page from said server machine to said client machine to receive information for each field in said first plurality of fields indicated to be an editable field by said first user input, said at least one edit page is provided for less than all of said second plurality of fields requiring user input for said first server action; and
performing said first server action by using said pre-defined data from at least one of said first plurality of fields of said template as input for at least one of said second plurality of fields requiring user input for said first server action.

25. The method of claim 24 wherein:
receiving first user input includes receiving a candidate value for a first field of said first plurality of fields, said pre-defined data includes said candidate value; and
performing said first server action includes:
transmitting to said client machine said candidate value; and
causing said client machine to provide to a user of said client machine an option of selecting said candidate value as the user input to use for said first field during performance of said first server action.

26. The method of claim 24 wherein performing said first server action by using said pre-defined data includes performing said first server action using a portion of said pre-defined data as user input for one of said first plurality of fields without transmitting said portion of said pre-defined data to said client machine.

* * * * *